US012033789B2

(12) United States Patent
Yoshioka et al.

(10) Patent No.: US 12,033,789 B2
(45) Date of Patent: Jul. 9, 2024

(54) INDUCTOR COMPONENT AND INDUCTOR COMPONENT EMBEDDED SUBSTRATE

(71) Applicant: Murata Manufacturing Co., Ltd., Kyoto-fu (JP)

(72) Inventors: Yoshimasa Yoshioka, Nagaokakyo (JP); Kouji Yamauchi, Nagaokakyo (JP); Akinori Hamada, Nagaokakyo (JP); Daisuke Kurafuji, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 508 days.

(21) Appl. No.: 16/986,173

(22) Filed: Aug. 5, 2020

(65) Prior Publication Data

US 2021/0043367 A1 Feb. 11, 2021

(30) Foreign Application Priority Data

Aug. 9, 2019 (JP) ................................ 2019-147599

(51) Int. Cl.
*H01F 27/29* (2006.01)
*H01F 17/04* (2006.01)
(Continued)

(52) U.S. Cl.
CPC ........... *H01F 27/292* (2013.01); *H01F 17/04* (2013.01); *H01F 27/255* (2013.01);
(Continued)

(58) Field of Classification Search
CPC ...... H01F 27/292; H01F 17/04; H01F 27/255; H01F 27/2828; H01F 27/324; H01F 2017/048
See application file for complete search history.

(56) References Cited

U.S. PATENT DOCUMENTS

2005/0018382 A1* 1/2005 Takazawa ........... H01F 17/0013 361/321.2
2015/0102888 A1* 4/2015 Kim ................... H01F 17/0013 336/200
(Continued)

FOREIGN PATENT DOCUMENTS

CN 105321685 A 2/2016
CN 107818864 A 3/2018
(Continued)

OTHER PUBLICATIONS

An Office Action; "Notice of Reasons for Refusal," mailed by the Japanese Patent Office dated Apr. 5, 2022, which corresponds to Japanese Patent Application No. 2019-147599 and is related to U.S. Appl. No. 16/986,173 with English language translation.
(Continued)

*Primary Examiner* — Malcolm Barnes
(74) *Attorney, Agent, or Firm* — Studebaker & Brackett PC

(57) ABSTRACT

An inductor component in which degradation of the insulation property, the inductance acquisition efficiency, and mechanical strength is suppressed. An inductor component includes a flat plate-shaped main body containing magnetic powder and a resin piece containing the magnetic powder; an inductor wire arranged in the main body; and an external terminal electrically connected to the inductor wire and exposed from a main surface of the main body. An average particle size X of the magnetic powder, a thickness T orthogonal to the main surface of the main body, and a first arithmetic mean roughness $R_{a1}$ of a part of a straight line on the main surface passing through the external terminal and excluding a part overlapping with the external terminal satisfying Formula (1): $X/10 \leq R_{a1} \leq T/10$ . . . Formula (1).

22 Claims, 13 Drawing Sheets

(51) Int. Cl.

| | |
|---|---|
| ***H01F 27/25*** | (2006.01) |
| ***H01F 27/255*** | (2006.01) |
| ***H01F 27/28*** | (2006.01) |
| ***H01F 27/32*** | (2006.01) |
| ***H01F 41/02*** | (2006.01) |

(52) U.S. Cl.

CPC ....... *H01F 27/2828* (2013.01); *H01F 27/324* (2013.01); *H01F 41/0246* (2013.01); *H01F 2017/048* (2013.01)

(56) References Cited

U.S. PATENT DOCUMENTS

2016/0035476 A1* 2/2016 Mimura ................ H01F 41/046 336/199
2016/0260535 A1* 9/2016 Kubota ............... H01F 17/0013
2017/0169930 A1* 6/2017 Kudo .................. H01F 17/0013
2018/0075965 A1* 3/2018 Yoshioka ............ H01F 27/2828
2018/0137965 A1* 5/2018 Lee ...................... H01F 17/0033
2018/0166198 A1* 6/2018 Kim ..................... H01F 17/0013

FOREIGN PATENT DOCUMENTS

JP 2009-099572 A 5/2009
JP 2009099572 A * 5/2009 ......... H01F 17/0013
JP 2016-032050 A 3/2016
JP 2016143759 A 8/2016
JP 2018-046051 A 3/2018

OTHER PUBLICATIONS

An Office Action mailed by China National Intellectual Property Administration dated Jan. 27, 2022, which corresponds to Chinese Patent Application No. 202010788068.6 and is related to U.S. Appl. No. 16/986,173 with English language translation.

* cited by examiner

INDUCTOR COMPONENT AND INDUCTOR COMPONENT EMBEDDED SUBSTRATE

CROSS-REFERENCE TO RELATED APPLICATION

This application claims benefit of priority to Japanese Patent Application No. 2019-147599, filed Aug. 9, 2019, the entire content of which is incorporated herein by reference.

BACKGROUND

Technical Field

The present disclosure relates to an inductor component and an inductor component embedded substrate.

Background Art

Japanese Patent Application Laid-Open No. 2016-143759 discloses a conventional inductor component. This inductor component includes a main body including resin containing magnetic powder; a spiral wire arranged inside the main body; and an external terminal formed on the outer surface of the main body and electrically connected to the spiral wire. In Japanese Patent Application Laid-Open No. 2016-143759, a manufacturing process for the inductor component involving cutting into individual chips is conducted with no magnetic powder falling off from the cutting surfaces. With the magnetic powder thus prevented from falling, the magnetic property is prevented from being compromised.

SUMMARY

However, the present inventors have studied the inductor component disclosed in Japanese Patent Laid-Open No. 2016-143759 to find out that the insulation property, the inductance acquisition efficiency, and mechanical strength of the main body are insufficient in some cases. Thus, the present disclosure provides an inductor component in which degradation of the insulation property, the inductance acquisition efficiency, and mechanical strength is suppressed. Also, the present disclosure provides an inductor component embedded substrate on which such an inductor component is mounted.

As a result of intensive studies, the present inventors have focused on electrical short circuiting between external terminals via magnetic powder in the vicinity of the main surface of the main body, not the cutting surface of the main body and completed the present disclosure based on the finding that the degradation of the insulation property of the main body is suppressed by dropping (removing) the magnetic powder in the vicinity of the main surface of the main body by a predetermined amount. That is, the present disclosure includes the following embodiments.

An inductor component according to an embodiment of the present disclosure includes a flat plate-shaped main body containing magnetic powder and a resin piece containing the magnetic powder; an inductor wire arranged in the main body; and an external terminal electrically connected to the inductor wire and exposed from a main surface of the main body. An average particle size X of the magnetic powder, a thickness T orthogonal to the main surface of the main body, and a first arithmetic mean roughness $R_{a1}$ of a part of a straight line on the main surface passing through the external terminal and excluding a part overlapping with the external terminal satisfying Formula (1):

$$X/10 \leq R_{a1} \leq T/10 \quad \text{Formula (1).}$$

In the present specification, the inductor wire is a wire to give inductance to an inductor component by generating a magnetic flux in a main body (magnetic material) containing magnetic powder when a current flows therethrough, and its structure, shape, or material is not particularly limited. The first arithmetic mean roughness $R_{a1}$ is calculated in accordance with Japanese Industrial Standard (JIS) B0601-2001.

The inductor component according to the present embodiment has the first arithmetic mean roughness $R_{a1}$ of X/10 or more as illustrated in Formula (1), so that the magnetic powder is removed in a part of the straight line, whereby the occurrence of electrical short circuiting from the external terminal passing through the magnetic powder is suppressed. As a result, for example, the degradation of the insulation property between external terminals can be suppressed. Furthermore, the first arithmetic mean roughness $R_a$ is equal to or less than T/10, and thus the magnetic powder is not excessively removed, whereby degradation of the inductance acquisition efficiency of the inductor component and degradation of mechanical strength are suppressed.

Thus, with the above-mentioned configuration, the magnetic powder is moderately removed from the main body, so that the degradation of the insulation property, the inductance acquisition efficiency, and mechanical strength can be suppressed.

Also, in one embodiment of the inductor component, the thickness T is 300 μm or less.

According to the embodiment, since the main body is thin, the proportion of the main surface is larger than that of the cross-sectional surface described above. As a result, the effect based on removal of the magnetic powder from the main surface can be more effectively obtained. Furthermore, for example, the inductor component can be embedded in a thin substrate, or mounted in a gap between a semiconductor silicon die and a substrate. Thus, the degree of freedom in installation can further be improved.

Furthermore, in one embodiment of the inductor component, the thickness of the external terminal orthogonal to the main surface is smaller than T/10.

According to the above-described embodiment, with the thickness of the external terminal being thus small, the thickness of the resin piece containing the magnetic powder of the main body to offer a larger contribution to the inductance than the external terminal does can be increased. Thus, the inductance of the inductor component can be improved. Furthermore, with the thickness of the external terminal thus designed to be small, stress due to heat or pressure is less likely to be applied to the vicinity of the external terminal when the inductor component is embedded. Thus, the inductor component can be more effectively prevented from damaging.

Also, in one embodiment of the inductor component, a second arithmetic mean roughness $R_{a2}$ of an entire portion including a part of the straight line passing through the external terminal on the main surface and including a part overlapping with the external terminal satisfies Formula (2):

$$R_{a2} < T/10 \quad (2).$$

In the present specification, the second arithmetic mean roughness $R_{a2}$ is calculated in accordance with Japanese Industrial Standard (JIS) B0601-2001.

According to the above-described embodiment, the surface unevenness of the inductor component is small, and thus, for example, the entire surface of the inductor component is less likely to receive stress due to heat or external force applied by a mounting solder for mounting the inductor component or a filler for embedding the inductor component. Thus, the inductor component can be more effectively prevented from being damaged.

Also, in one embodiment of the inductor component, the inductor component further includes a coating layer made of a non-magnetic material that covers the main surface.

According to the above-described embodiment, when the coating layer that covers the main surface of the main body and does not contain magnetic powder is further provided, for example, the insulation property between external terminals can be improved. Furthermore, with the unevenness of the main surface covered by the coating layer, the recognition accuracy using the appearance of the inductor component is improved.

Also, in one embodiment of the inductor component, the inductor component further includes an insulator made of a non-magnetic material with which the inductor wire comes into contact.

According to the above-described embodiment, it is possible to improve the insulation property in the vicinity of the inductor wire.

Also, in one embodiment of the inductor component, the insulator includes any of an epoxy resin, a phenol resin, a polyimide resin, an acrylic resin, a vinyl ether resin, and a mixture of these.

According to the above-described embodiment, when the insulator contains the resin, the bonding between the insulator and the resin piece contained in the main body can be improved, and as a result, the bonding strength between the inductor wire and the main body can be improved. Furthermore, since the resin of the insulator is softer than inorganic insulators, the main body can have flexibility, and thus can have higher mechanical strength against external stress.

Also, in one embodiment of the inductor component, the inductor wire extends parallel to the main surface.

According to the above-described embodiment, the inductor component can be made thinner.

Also, in one embodiment of the inductor component, the inductor component further includes a vertical wire that extends orthogonal to the main surface, is connected to the inductor wire and the external terminal, and penetrates the main body.

According to the above-described embodiment, the inductor wire and the external terminal can be linearly connected, and it is possible to suppress an increase in DC electric resistance and the degradation of the inductance acquisition efficiency due to extra wire routing.

Also, in one embodiment of the inductor component, a plurality of the inductor wires are arranged in a direction orthogonal to the main surface.

According to the above-described embodiment, stacking the inductor wires can reduce the influence on the mounting area. Furthermore, if the inductor wires stacked are connected in series, the inductance of the inductor component can be enhanced.

Also, in one embodiment of the inductor component, a plurality of the inductor wires are arranged in a same plane.

According to the above-described embodiment, the influence on the thickness T can be reduced. Furthermore, an inductor array can be formed by the plurality of inductor wires arranged in the same plane.

Also, in one embodiment of the inductor component, the magnetic powder includes Fe-based magnetic powder.

According to the above-described embodiment, since the magnetic powder includes Fe-based magnetic powder, the inductor component can achieve excellent DC superimposition characteristics.

Also, in one embodiment of the inductor component, the magnetic powder includes ferrite powder.

According to the above-described embodiment, since the magnetic powder includes ferrite powder, the inductance of the inductor component can be increased. The ferrite powder features higher insulation property than Fe-based magnetic powder, and thus the insulation property of the main body can further be increased.

Also, in one embodiment of the inductor component, the main body further contains non-magnetic powder made of an insulator.

According to the above-described embodiment, when the main body contains non-magnetic powder made of an insulator, the insulation property of the main body can be further enhanced.

Also, in one embodiment of the inductor component, the resin piece containing the magnetic powder includes an epoxy resin or an acrylic resin.

According to the above-described embodiment, the insulation property of the main body can be further enhanced. Moreover, high stress relaxation effect is achieved, so that the mechanical strength of the main body can be further enhanced.

An inductor component embedded substrate according to an aspect of the present disclosure is a substrate in which the inductor component according to the above-described embodiment is embedded. The substrate includes a substrate main surface; a substrate wiring extending along the substrate main surface; and a substrate via portion extending orthogonal to the substrate main surface and connected to the substrate wiring. The external terminal of the inductor component is directly connected to the substrate via portion.

According to the above-described embodiment, the inductor component embedded substrate includes an inductor component in which the degradation of the insulation property, the inductance acquisition efficiency, and mechanical strength is suppressed.

Furthermore, in one embodiment of the inductor component embedded substrate, the main surface of the main body of the inductor component and the substrate main surface are parallel to each other.

According to the above-described embodiment, the inductor component embedded substrate can be made thinner.

According to the present disclosure, it is possible to provide an inductor component in which degradation of insulation property, inductance acquisition efficiency, and mechanical strength is suppressed, and provide an inductor component embedded substrate on which such an inductor component is mounted.

DETAILED DESCRIPTION

Hereinafter, an inductor component and an inductor component embedded substrate according to one aspect of the present disclosure will be described in detail with reference to the illustrated embodiments. It should be noted that the drawings include some schematic ones and may not reflect actual dimensions or ratios. When a plurality of upper limit values and lower limit values are described for a specific parameter, any upper limit value and lower limit value of these upper limit values and lower limit values can be combined to obtain a suitable numerical range.

Inductor Component

First Embodiment

[Configuration]

Figure 1A:
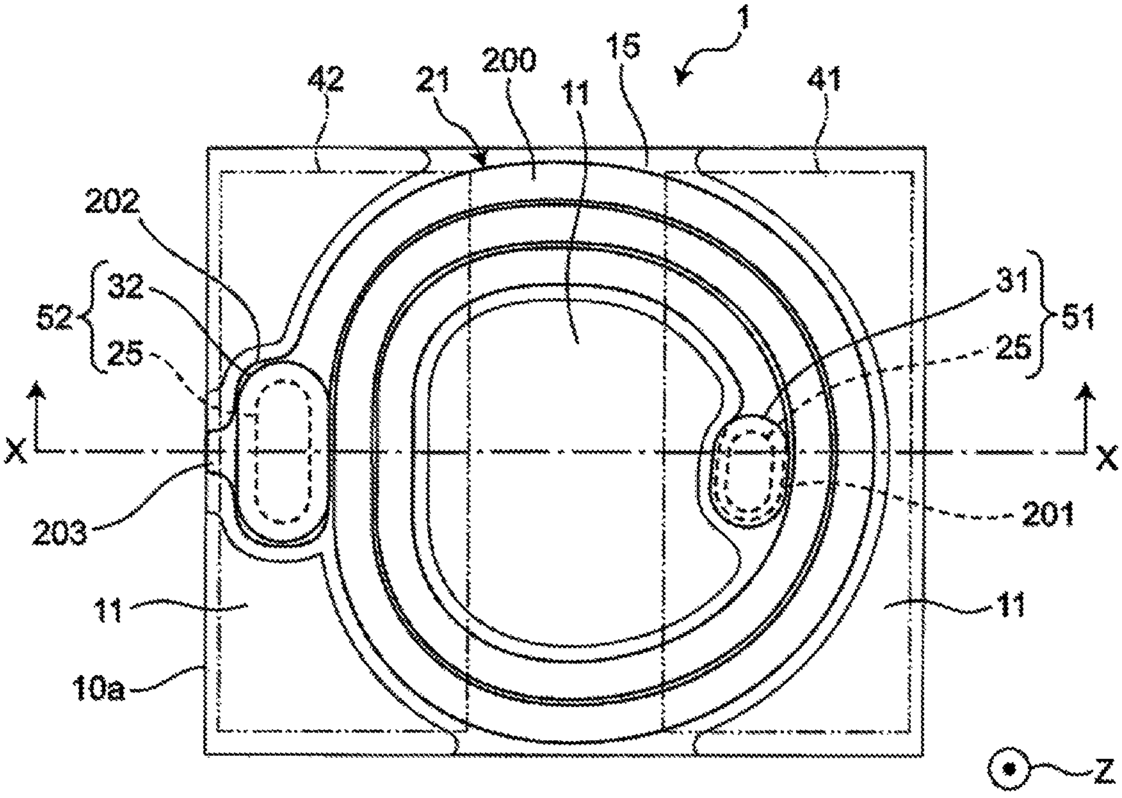
FIG. 1A is a perspective plan view illustrating an inductor component according to a first embodiment.
Figure 1B:
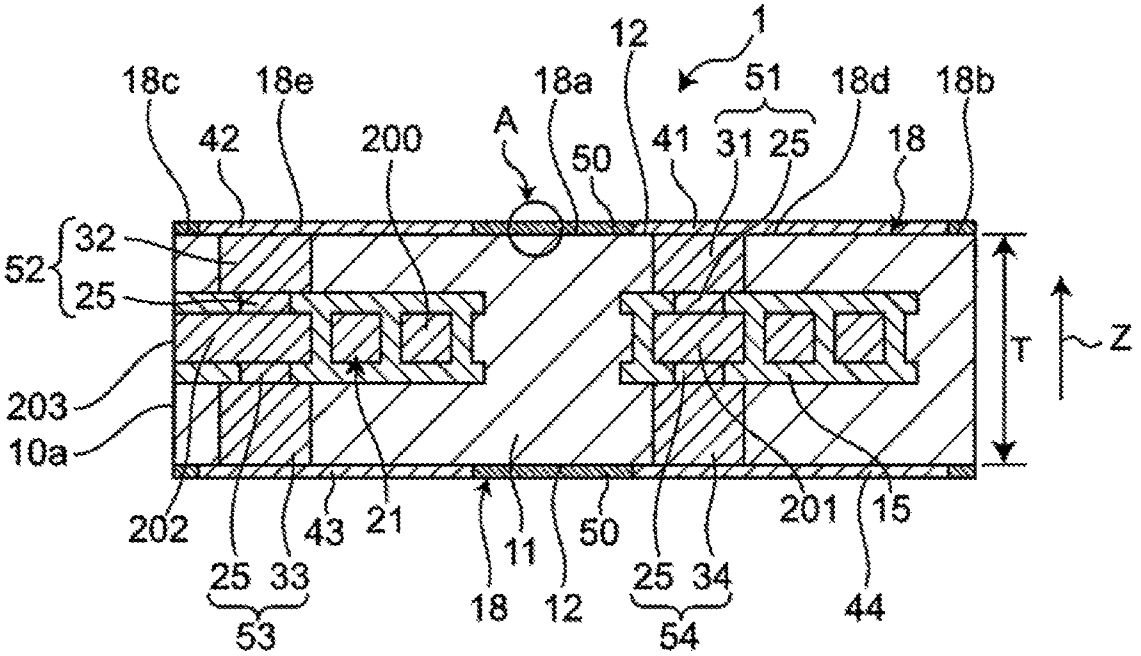
FIG. 1B is a sectional view illustrating the inductor component according to the first embodiment.

An inductor component according to a first embodiment of the present disclosure will be described with reference to FIGS. 1A and 1B. FIG. 1A is a perspective plan view illustrating the inductor component according to the first embodiment. FIG. 1B is a sectional view (sectional view taken along X-X in FIG. 1A) illustrating the inductor component according to the first embodiment.

For example, this inductor component 1 is mounted on an electronic device such as a personal computer, a DVD player, a digital camera, TV, a mobile phone, or car electronics, and has a rectangular shape as a whole. However, the shape of the inductor component 1 is not particularly limited, and may be a columnar shape, a polygonal pillar shape, a truncated cone shape, or a polygonal truncated cone shape.

As illustrated in FIGS. 1A and 1B, the inductor component 1 includes a flat plate-shaped main body 11, a spiral wire 21 that is an example of an inductor wire in the present embodiment, and external terminals 41 to 44. The spiral wire 21 is provided in the main body 11. The external terminals 41 to 44 are electrically connected to the spiral wire 21 and are exposed on upper and lower main surfaces 12 of the main body 11.

Figure 1C:
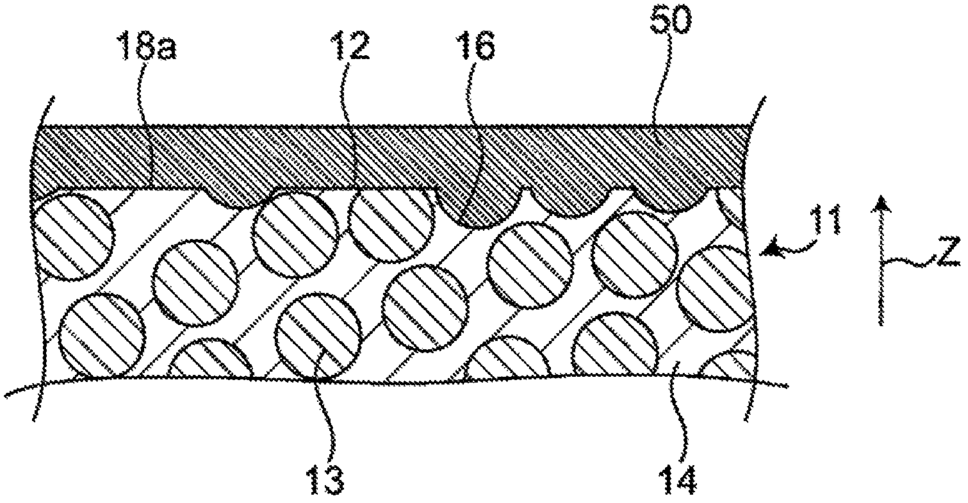
FIG. 1C is an enlarged view of part A in FIG. 1B.

FIG. 1C is an enlarged view of part A in FIG. 1B. As illustrated in FIG. 1C, the main body 11 includes magnetic powder 13 and a resin piece 14 containing the magnetic powder 13. Therefore, in the main body 11, the DC superimposition characteristics can be improved by the magnetic powder 13 and the magnetic powder 13 is electrically insulated by the resin piece 14, whereby the loss (core loss) at high frequencies is suppressed.

The upper and lower main surfaces 12 of the main body 11 have unevenness. This unevenness is formed by removing part of the magnetic powder 13 from the main surfaces 12. The unevenness is mainly defined by flat parts of the resin piece 14 and recesses 16 formed by the removal of the magnetic powder 13. On the main surface 12 of the main body 11 according to the present embodiment, the recesses 16 formed by the removal of the magnetic powder 13, which is the latter one of the factors described above, are the dominant factor of arithmetic mean roughness $R_{a1}$, $R_{a2}$ described later. For example, a layer (a coating layer 50 and the first to the fourth external terminals 41 to 44) that comes into contact with the main surface 12 enters the recesses 16. Thus, bonding between the main surface 12 of the main body 11 and the surface in contact with the main surface 12 is improved by an anchor effect.

An average particle size X of the magnetic powder, a thickness T orthogonal to the main surface 12 of the main body 11, and the first arithmetic mean roughness $R_{a1}$ of a part of a straight line on the main surface 12 passing through the external terminal terminals 41 and 42 and excluding a part overlapping with the external terminals 41 and 42 satisfy the following Formula (1):

$$X/10 \leq R_{a1} \leq T/10 \quad \text{Formula (1).}$$

In the present embodiment, this straight line refers to a straight line on the main surface 12 extending to pass through the first external terminal 41 and the second external terminal 42. For example, the straight line is on the main surface 12 at a position illustrated with the X-X cross-sectional line in FIG. 1A (a cross-sectional line at the center in the width direction of the inductor component 1 (a straight line connecting the center point of the first external terminal 41 and the center point of the second external terminal 42)), and is denoted by reference numeral 18 in FIG. 1B. A part of the straight line 18 includes a straight line portion of the straight line 18 in an area on the main surface 12 where the external terminals 41 and 42 are not provided. More specifically, as illustrated in FIG. 1B, the part of the straight line 18 includes a first portion 18*a* positioned between the external terminal 41 and the external terminal 42, a second portion 18*b* positioned on the outer side (side surface side of the main body 11) of the first external terminal 41, and a third portion 18*c* positioned on the outer side (side surface side of the main body 11) of the second external terminal 42. When the first external terminal 41 and the second external terminal 42 extend to the side surfaces of the main body 11, the second portion 18*b* and the third portion 18*c* do not exist. In such a case, the part of the straight line 18 includes the first portion 18*a* alone.

As indicated in Formula (1), the first arithmetic mean roughness $R_{a1}$ is equal to or more than X/10. This means that the magnetic powder 13 has been removed in the part of the straight line 18. More specifically, the magnetic powder 13 is moderately removed from the main surface 12, so that electrical short circuiting from the external terminals 41 to 44 via the magnetic powder 13 is prevented from occurring. As a result, for example, the degradation of the insulation property between the external terminals 41 to 44 can be suppressed. Furthermore, the first arithmetic mean roughness $R_{a1}$ is equal to or less than T/10, and thus the magnetic powder 13 is not excessively removed from the main surface 12, whereby degradation of the inductance acquisition efficiency of the inductor component 1 and degradation of mechanical strength are suppressed.

Thus, with the above-mentioned configuration, in the inductor component 1 according to the present embodiment, the magnetic powder 13 is moderately removed from the main body 11, so that the degradation of the insulation property, the inductance acquisition efficiency, and mechanical strength can be suppressed.

Furthermore, in Formula (1), X≤T holds. When the average particle size X of the magnetic powder 13 is equal to or less than T, the degradation of the mechanical strength of the inductor component 1 can be suppressed. This is because, for example, when X>T holds, a considerable number of particles of the magnetic powder 13 have a particle size with which majority of the magnetic powder 13 protrudes from the main body 11, meaning that the magnetic powder 13 is likely to be excessively removed from the main surface 12 of the main body 11 in a grinding process in manufacturing of the inductor component 1.

Furthermore, with the unevenness provided on the main surface 12 of the main body 11 through the moderate removal, electrical short circuiting to the outside of the inductor component 1 through the external terminals 41 to 44 via the magnetic powder 13 is less likely to occur. All things considered, the inductor component 1 according to the first embodiment is particularly thin and is highly suitable for embedding applications.

The lower main surface 12 also satisfies Formula (1) as described above. Thus, it suffices if Formula (1) is satisfied on the main surfaces 12 provided with the external terminals 41 to 44 (as well as vertical wires 51 to 54). The straight line is not limited to straight lines on the main surfaces 12 at the position indicated by the X-X cross-sectional line as described above, and may be any straight line that intersects the X-X cross-sectional line and passes through the external terminals 41 and 42. When there are a plurality of straight lines on one main surface 12, it suffices if Formula (1) is satisfied with at least one of the plurality of straight lines. When the two main surfaces are each provided with the external terminals with each main surface 12 having a plurality of the straight lines, it suffices if Formula (1) is satisfied with at least one straight line on each main surface.

The average particle size X of the magnetic powder 13 is, for example, 0.1 μm or more and 50 μm or less (i.e., from 0.1 μm to 50 μm), preferably 1 μm or more and 30 μm or less (i.e., from 1 μm to 30 μm), and even more preferably 2 μm or more and 5 μm or less (i.e., from 2 μm to 5 μm). The magnetic powder 13 with an average particle size of 0.1 μm or more can be evenly dispersed in the resin piece 14 easily, so that the main body 11 can be more efficiently manufactured. The magnetic powder 13 with an average particle size of 50 μm or less more effectively improves the DC superimposition characteristics, and the core loss at high frequencies can be reduced with fine powder.

The average particle size X of the metal magnetic powder 13 in a raw material state to be contained in the resin piece 14 can be calculated as a particle size (volume median diameter $D_{50}$) that is 50% of an integrated value in a particle size distribution obtained by laser diffraction/scattering method.

In the inductor component 1 in a finished product state, the average particle size X of the metal magnetic powder 13 is measured using a scanning electron microscope (SEM) image of the cross section passing through the straight line 18 on the main surface 12 of the main body 11. Specifically, in an SEM image at a magnification enabling observation of 15 or more particles of the magnetic powder 13, the area of each particle of the magnetic powder 13 is measured, the equivalent circle diameter is calculated by $\{4/\pi\times(\text{area})\}^{\wedge}(1/2)$, and the arithmetic mean value thereof is obtained as the average particle size X of the magnetic powder 13.

The thickness T orthogonal to the main surface 12 of the main body 11 is preferably 300 μm or less, and is more preferably 100 μm or more and 250 μm or less (i.e., from 100 μm to 250 μm). When the thickness T orthogonal to the main surface 12 of the main body 11 is 300 μm or less, the main body 11 is thin. Thus, the proportion of the main surface is larger than that of the cross-sectional surface described above. As a result, the effect based on removal of the magnetic powder 13 from the main surface 12 (suppression of the degradation of the insulation property, the inductance acquisition efficiency, and mechanical strength) can be more effectively obtained. Furthermore, for example, the inductor component 1 can be embedded in a thin substrate, or mounted in a gap between a semiconductor silicon die and a substrate. Thus, the degree of freedom in installation can further be improved. The thickness T is measured using a scanning electron microscope. Specifically, the inductor component 1 is cut along a straight line on the main surface passing through the external terminals 41 and 42 to form a cross section parallel with the Z direction. The inductor component 1 obtained serves as a measurement target. An SEM image is obtained from the cross section of the measurement sample using a scanning electron microscope. The thickness T is measured using the SEM image.

The first arithmetic mean roughness $R_{a1}$ is preferably 0.1 μm or more and 10 μm or less (i.e., from 0.1 μm to 10 μm), and more preferably 0.2 μm or more and 0.4 μm or less (i.e., from 0.2 μm to 0.4 μm) in terms of further suppression of the occurrence of electrical short circuiting from the external terminals 41 to 44 via the magnetic powder 13. The first arithmetic mean roughness $R_{a1}$ can be measured using a shape analysis laser microscope ("shape measurement laser microscope VK-X100" manufactured by Keyence Corporation). Specifically, the coating layer 50 of the inductor component 1 is peeled off to expose the main surface 12 of the main body 11. On the exposed main surface 12, the first arithmetic mean roughness $R_{a1}$ of the portion including the straight line on the main surface 12 that passes through the external terminals 41 and 42 is measured at a measurement magnification of 50 times.

The main body 11 may further contain non-magnetic powder made of an insulator. When the main body 11 contains non-magnetic powder made of an insulator, the insulation property of the main body 11 can be further enhanced.

Examples of the magnetic powder 13 include a FeSi-based alloy such as FeSiCr, a FeCo-based alloy, a Fe-based alloy such as NiFe, an amorphous alloy of these, or a ferrite such as a NiZn-based or MnZn-based ferrite. One or a combination of these types of magnetic powder may be used.

In a preferred aspect, the magnetic powder 13 includes Fe-based magnetic powder. When the magnetic powder 13 includes Fe-based magnetic powder, the inductor component 1 of the present disclosure can achieve excellent DC superimposition characteristics. Examples of the Fe-based magnetic powder include a FeSi-based alloy such as FeSiCr, a FeCo-based alloy, a Fe-based alloy such as NiFe, or an amorphous alloy of these. One or a combination of these types of Fe-based magnetic powder may be used.

In another preferred aspect, the magnetic powder 13 includes ferrite powder. When the magnetic powder 13 includes ferrite powder, the inductor component 1 of the present disclosure can have high inductance. The ferrite powder features higher insulation property than Fe-based magnetic powder, and thus the insulation property of the main body 11 can further be increased. Examples of the ferrite powder include a NiZn-based ferrite and a MnZn-based ferrite. One or a combination of these types of ferrite powder may be used.

In a preferred aspect, the content of the magnetic powder 13 is preferably 15 vol % or more and 75 vol % or less (i.e., from 15 vol % to 75 vol %), and more preferably 20 vol % or more and 70 vol % or less (i.e., from 20 vol % to 70 vol %) with respect to the entire main body 11. When the content of the magnetic powder 13 is 15 vol % or more and 75 vol % or less (i.e., from 15 vol % to 75 vol %), the inductor component 1 of the present disclosure has excellent DC superimposition characteristics and excellent insulation property.

The resin piece 14 includes, for example, any of an epoxy resin, a polyimide resin, a phenol resin, and a vinyl ether resin, and preferably includes an epoxy resin or an acrylic resin. When the resin piece 14 includes these types of resins, the inductor component 1 has improved insulation reliability. The main body 11 including an epoxy resin or an acrylic resin in particular can have further improved insulation property. Moreover, high stress relaxation effect is achieved, so that the mechanical strength of the main body 11 can be further improved. Furthermore, in such a case, with the insulation property ensured between particles of the magnetic powder 13, the loss (core loss) at high frequencies can be made small.

The spiral wire 21 is an inductor wire arranged in the main body 11 and extending in a spiral shape on a predetermined plane. Preferably, the spiral wire 21 extends in parallel with the main surface 12. Thus, the plane (a winding plane for example) on which the spiral wire 21 extends in a spiral shape is preferably in parallel with the main surface 12. When the plane on which the spiral wire 21 extends in a spiral shape is in parallel with the main surface 12, the inductor component 1 can be made even thinner. The spiral wire 21 may have a spiral shape with the number of turns being two or more. In such a case, for example, the spiral wire 21 in plan view is spirally wound clockwise from an outer circumference edge (second pad portion 202) toward an inner circumference edge (first pad portion 201) in a spiral form as illustrated in FIG. 1A.

The spiral wire (spiral portion) means a curve (two-dimensional curve) that extends on a plane, and may be a curve with the number of turns being two or more, or less than one. Furthermore, part of the spiral wire may be linear.

The thickness of the spiral wire 21 orthogonal to the plane on which it extends in a spiral shape is preferably 40 μm or more and 120 μm or less (i.e., from 40 μm to 120 μm), for example. As an example of the spiral wire 21, the thickness is 45 μm, the wire width is 50 μm, and the inter-wire space is 10 μm. The inter-wire space is preferably 3 μm or more and 20 μm or less (i.e., from 3 μm to 20 μm).

The spiral wire 21 is made of a conductive material, and is made of a metal material with low electric resistance such as Cu, Ag, Au, and Fe, or an alloy containing these, for example. Thus, the DC resistance of the spiral wire 21 can be made low. In the present embodiment, the inductor component 1 has only one layer of the spiral wire 21, which can achieve a thinner configuration of the inductor component 1 than a configuration in which a plurality of spiral wires are stacked.

The spiral wire 21 is arranged on a first plane orthogonal to the first direction Z. The spiral wire 21 includes a spiral portion 200, a first pad portion 201, a second pad portion 202, and a lead portion 203. The first pad portion 201 is connected to the first vertical wire 51 and the fourth vertical wire 54, and the second pad portion 202 is connected to the second vertical wire 52 and the third vertical wire 53. The spiral portion 200 extends on the first plane from the first pad portion 201 and the second pad portion 202 with the first pad portion 201 being the inner end and the second pad portion 202 being the outer end, to be wound in a spiral form. The lead portion 203 extends on the first plane from the second pad portion 202 and is exposed on a first side surface 10*a* of the main body 11, which is in parallel with the first direction Z.

The inductor component 1 of the present disclosure preferably further includes an insulator 15 with which the spiral wire 21 comes into contact. With the insulator 15 with which the spiral wire 21 comes into contact further provided, the insulation property around the spiral wire 21 can be enhanced. For example, in FIGS. 1A and 1B, the surface of the spiral wire 21 is coated with the insulator 15. More specifically, all the side surface of the spiral wire 21 is coated with the insulator 15, and the upper surface and the bottom surface of the spiral wire 21 are coated with the insulator 15 except for the pad portions 201 and 202, which are portions to be in contact with the a via wire 25. The insulator 15 has holes at positions corresponding to the pad portions 201 and 202 of the spiral wire 21. The holes can be formed by, for example, laser perforation. The thickness of the insulator 15 between the main body 11 and the bottom surface of the spiral wire 21 is, for example, 10 μm or less.

The insulator 15 is a non-magnetic material including no magnetic material, and includes an insulating material. Examples of the insulating material include any of an epoxy resin, a phenol resin, a polyimide resin, an acrylic resin, a vinyl ether resin, and a mixture of these. When the insulator contains these types of resins, the spiral wire 21 and the resin piece 14 contained in the main body 11 come into close contact with each other with the above-mentioned resin of the insulator 15 interposed therebetween. As a result, the bonding strength between the spiral wire 21 and the main body 11 can be improved. Furthermore, since the resin of the insulator 15 is softer than inorganic insulators, the main body 11 can have flexibility, and thus can have higher mechanical strength against external stress. The insulator 15 may include a filler that is a non-magnetic material such as silica. In such a case, the insulator 15 can have improved strength, workability, and electrical characteristics.

Figure 2:
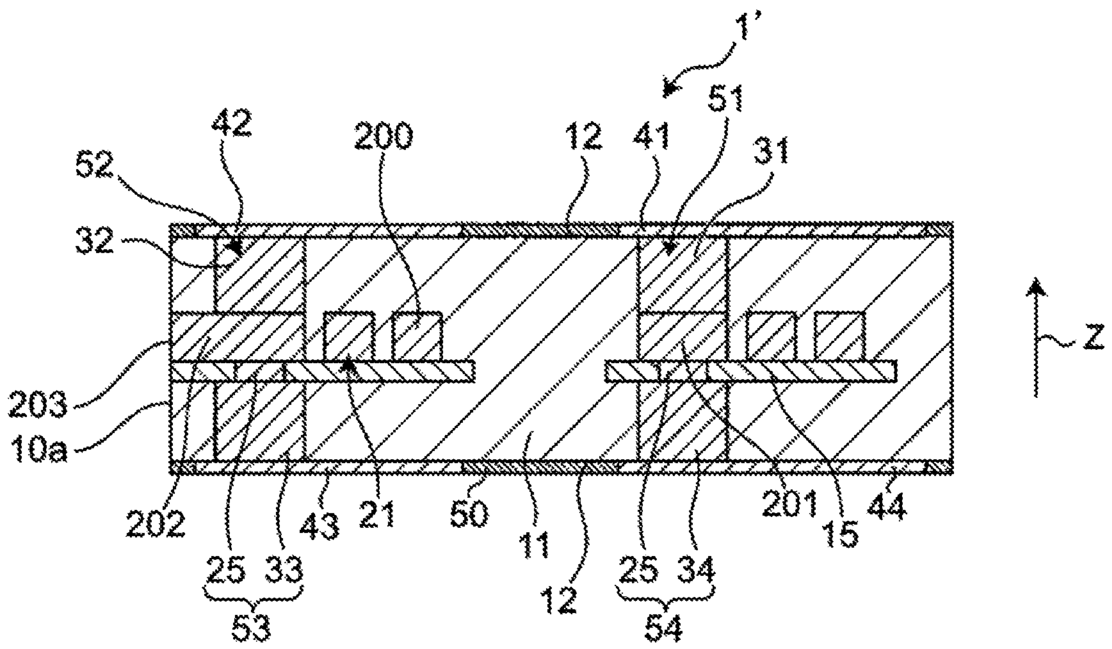
FIG. 2 is a sectional view illustrating another form of the inductor component according to the first embodiment.

Note that the inductor component 1 of the present disclosure may not include the insulator 15. Furthermore, the insulator 15 may cover only a part of the spiral wire 21. For example, as illustrated in FIG. 2, an inductor component 1' may have the insulator 15 covering only the bottom surface of the spiral wire 21.

The inductor component 1 according to the present embodiment further includes the vertical wires 51 to 54. The vertical wires 51 to 54 extend in a direction orthogonal to the main surface 12 and are connected to the spiral wire 21 and the external terminals 41 to 44. In other words, the vertical wires 51 to 54 are electrically connected to the spiral wire while being orthogonal to the plane on which the spiral wire 21 extends. The vertical wires 51 to 54 are made of the same conductive material as the spiral wire 21, extend in the first direction Z through the main body 11 from the spiral wire 21. With the inductor component 1 including the vertical wires 51 to 54, linear connection can be established between the spiral wire 21 and the first to the fourth external terminals 41 to 44. Specifically, the vertical wires 51 and 54 can establish linear connection between the spiral wire 21 and the first and the fourth external terminals 41 and 44. Furthermore, the vertical wires 52 and 53 can establish linear connection between the spiral wire 21 and the second and the third external terminals 42 and 43. This can suppress an increase in DC electric resistance and degradation of the inductance acquisition efficiency due to extra wire routing.

The first vertical wire 51 includes a via wire 25 that extends upward from the upper surface of the first pad portion 201 of the spiral wire 21 through the insulator 15, and a first columnar wire 31 that extends upward from the via wire 25. The second vertical wire 52 includes a via wire 25 that extends upward from the upper surface of the second pad portion 202 of the spiral wire 21 through the insulator 15, and a second columnar wire 32 that extends upward from the via wire 25. The third vertical wire 53 includes a via wire 25 that extends downward from the lower surface of the second pad portion 202 of the spiral wire 21 through the insulator 15, and a third columnar wire 33 that extends downward from the via wire 25. The fourth vertical wire 54 includes a via wire 25 that extends downward from the lower surface of the first pad portion 201 of the spiral wire 21 through the insulator 15, and a fourth columnar wire 34 that extends downward from the via wire 25.

The external terminals 41 to 44 are electrically connected to the spiral wire 21 and are exposed on the main surfaces 12 of the main body 11. The external terminals 41 to 44 cover a part of the main surfaces 12 of the main body 11 and are electrically connected to the spiral wire 21 via the vertical wires 51 to 54.

The first external terminal 41 is provided on a part of the main surface 12 on the upper surface side of the main body 11, and covers an end surface of the first columnar wire 31 exposed on the main surface 12. Thus, the first external terminal 41 is electrically connected to the first pad portion 201 of the spiral wire 21. The second external terminal 42 is provided on a part of the main surface 12 on the upper surface side of the main body 11, and covers an end surface of the second columnar wire 32 exposed on the main surface 12. Thus, the second external terminal 42 is electrically connected to the second pad portion 202 of the spiral wire 21. The third external terminal 43 is provided on a part of the main surface 12 on the lower surface side of the main body 11, and covers an end surface of the third columnar wire 33 exposed on the main surface 12. Thus, the third external terminal 43 is electrically connected to the second pad portion 202 of the spiral wire 21. The fourth external terminal 44 is provided on a part of the main surface 12 on the lower surface side of the main body 11, and covers an end surface of the fourth columnar wire 34 exposed on the main surface 12. Thus, the fourth external terminal 44 is electrically connected to the first pad portion 201 of the spiral wire 21.

The external terminals 41 to 44 are made of a conductive material. The conductive material is, for example, at least one of Cu, Ni, and Au, or an alloy thereof. Furthermore, the external terminals 41 to 44 may be a multilayer metal film formed by stacking a plurality of metal films. The multilayer metal film includes metal films of a three-layer structure in which a Cu metal layer featuring low electrical resistance and excellent stress resistance, a Ni metal layer featuring excellent corrosion resistance, and an Au metal layer featuring excellent solder wettability and reliability that are arranged in this order from the inner side toward the outer side.

The external terminals 41 to 44 are subjected to rust prevention treatment. Here, the rust prevention treatment includes forming a Ni metal layer and an Au metal, or a Ni metal layer and a Sn metal layer, and the like as a coating film on the surfaces of the external terminals 41 to 44. This suppresses copper erosion due to soldering and rust, whereby the inductor component 1 with high mounting reliability can be provided.

The thickness of the external terminals 41 to 44 orthogonal to the main surface 12 is preferably smaller than T/10. With the thickness of the external terminals 41 to 44 being thus small, the thickness of the resin piece 14 containing the magnetic powder 13 to offer a larger contribution to the inductance than the external terminals 41 to 44 do can be increased. Thus, the inductance of the inductor component 1 can be improved. Furthermore, with the thickness of the external terminals 41 to 44 thus designed to be small, stress due to heat or external force is less likely to be applied to the vicinity of the external terminals 41 to 44 when the inductor component 1 is embedded. Thus, the inductor component 1 can be more effectively prevented from damaging.

In a preferred aspect, the second arithmetic mean roughness $R_{a2}$ of the entire portion including a part of the straight line 18 passing through the external terminals 41 and 42 on the main surface 12 and including a part overlapping with the external terminals 41 and 42 satisfies the following Formula (2):

$$R_{a2}<T/10 \quad (2).$$

In this embodiment, the entire portion of the straight line 18 includes the straight line portions of the straight line 18 in the area on the main surface 12 where the external terminals 41 and 42 are provided and the area on the main surface 12 where the external terminals 41 and 42 are not provided. More specifically, as illustrated in FIG. 1B, the entire portion includes a first portion 18_a_, a second portion 18_b_, a third portion 18_c_, a fourth portion 13_d_ that overlaps with the first external terminal 41, and a fifth portion 13_e_ that overlaps with the second external terminal 42.

When the inductor component 1 of the present disclosure satisfies Formula (2) described above, the surface unevenness of the inductor component 1 is small. Thus, for example, the entire surface of the inductor component 1 is less likely to receive stress due to heat or external force applied by a mounting solder for mounting the inductor component 1 or a filler for embedding the inductor component 1. Thus, the inductor component 1 can be more effectively prevented from being damaged.

The external terminals 41 to 44 (as well as the vertical wires 51 to 54) may be provided on only one of the upper and lower main surfaces 12. In this case, it suffices if Formula (1) is satisfied on the main surface 12 provided with the external terminals 41 to 44.

The inductor component 1 of the present disclosure further includes the coating layer 50 that covers the main surface 12. With the coating layer 50 provided on the main surface 12, for example, higher insulation property can be achieved between the external terminals 41 to 44 (more specifically, between the first external terminal 41 and the second external terminal, and between the third external terminal 43 and the fourth external terminal 44). Furthermore, with the unevenness of the main surface 12 covered by the coating layer 50, the recognition accuracy using the appearance of the inductor component 1 is improved.

The coating layer 50 is a non-magnetic material including no magnetic material, and is made of, for example, a columnar wire and an insulating material exemplified as the material of the insulator 15. The coating layer 50 covers a part of the main surface 12 of the main body 11, with the end surfaces of the external terminals 41 to 44 exposed. The coating layer 50 can guarantee the insulation property on the surface of the inductor component 1.

[Method of Manufacturing Inductor Component]

Figure 3A:
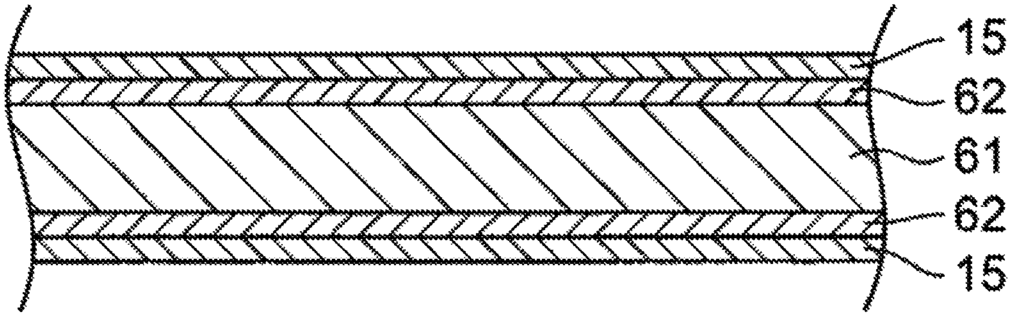
FIG. 3A is an explanatory diagram illustrating a method of manufacturing the inductor component according to the first embodiment.

An example of a method of manufacturing the inductor component 1 according to the present embodiment will be described with reference to FIGS. 3A to 3M. A dummy core substrate 61 is prepared as illustrated in FIG. 3A. The dummy core substrate 61 has substrate copper foil on both surfaces. In the present embodiment, the dummy core substrate 61 is a glass epoxy substrate. The thickness of the dummy core substrate 61 does not affect the thickness of the inductor component 1. Thus, the dummy core substrate 61 with a thickness enabling easy handling in terms of warpage in processing may be used.

Next, copper foil (dummy metal layer) 62 is bonded on the surface of the substrate copper foil. The copper foil 62 is bonded to the smooth surface of the substrate copper foil. Thus, the bonding strength between the copper foil 62 and the substrate copper foil can be made small, whereby the dummy core substrate 61 can be easily peeled from the copper foil 62 in a later step. Preferably, a low tackiness agent is used as the adhesive for bonding the dummy core substrate 61 and the copper foil 62 to each other. Moreover, the bonding surfaces between the dummy core substrate 61 and the copper foil 62 are preferably glossy surfaces for the sake of reduction in the bonding force between the dummy core substrate 61 and the copper foil 62.

Then, the insulator 15 is stacked on the copper foil 62. In this process, thermocompression bonding and thermosetting of the insulator 15 are performed using a vacuum laminator, a press machine, and the like.

Figure 3B:
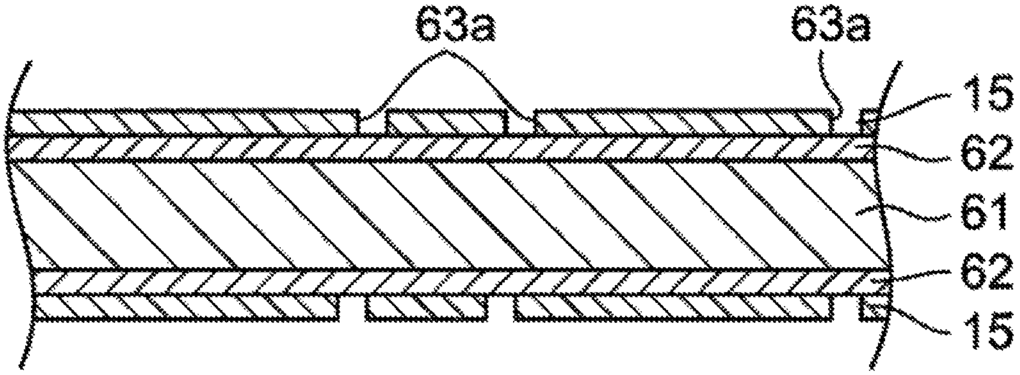
FIG. 3B is an explanatory diagram illustrating the method of manufacturing the inductor component according to the first embodiment.
Figure 3C:
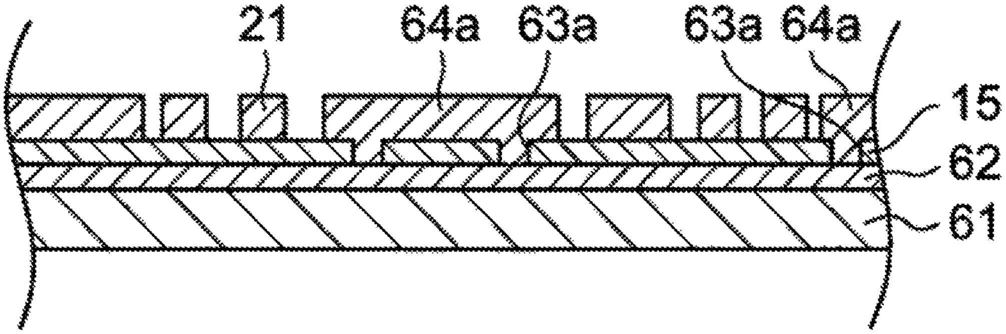
FIG. 3C is an explanatory diagram illustrating the method of manufacturing the inductor component according to the first embodiment.

As illustrated in FIG. 3B, a cavity 63*a* is formed in the insulator 15 by laser processing or the like. Then, as illustrated in FIG. 3C, a dummy copper piece 64*a* and the spiral wire 21 are formed on the insulator 15. Specifically, a power supply film (not illustrated) for SAP is formed on the insulator 15 by electroless plating, sputtering, vapor deposition, or the like. After the power supply film is formed, a photosensitive resist is applied or bonded on the power supply film, and a cavity of the photosensitive resist is formed by photolithography in a portion to be a wire pattern. Then, a metal wire corresponding to the dummy copper piece 64*a* and the spiral wire 21 is formed in the cavity of the photosensitive resist layer. After the metal wire is formed, the photosensitive resist is peeled off with a chemical solution and the power supply film is removed by etching. Thereafter, additional copper electrolytic plating is performed with this metal wire serving as a power feeding portion, whereby wiring in a small space can be obtained. The cavity 63*a* formed as illustrated in FIG. 3B is filled with copper based on SAP.

Figure 3D:
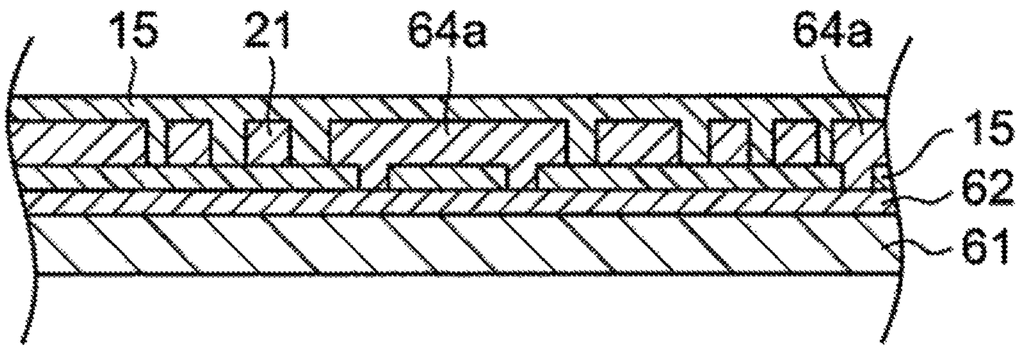
FIG. 3D is an explanatory diagram illustrating the method of manufacturing the inductor component according to the first embodiment.

Then, as illustrated in FIG. 3D, the dummy copper piece 64*a* and the spiral wire 21 are covered with the insulator 15. Thermocompression bonding and thermosetting of the insulator 15 are performed using a vacuum laminator, a press machine, and the like.

Figure 3E:
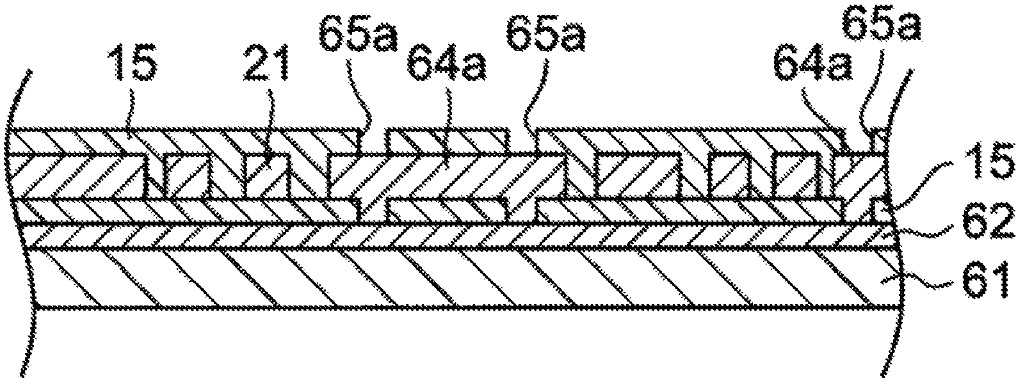
FIG. 3E is an explanatory diagram illustrating the method of manufacturing the inductor component according to the first embodiment.

Next, as illustrated in FIG. 3E, a cavity 65*a* is formed in the insulator 15 by laser processing or the like.

Figure 3F:
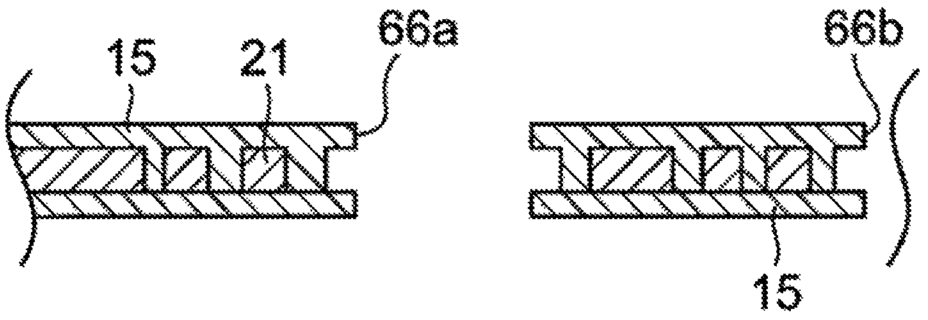
FIG. 3F is an explanatory diagram illustrating the method of manufacturing the inductor component according to the first embodiment.

Then, the dummy core substrate 61 is peeled off from the copper foil 62. Then, the copper foil 62 is removed by etching or the like, and the dummy copper piece 64*a* is removed by etching or the like. As a result, as illustrated in FIG. 3F, a hole portion 66*a* corresponding to an inner magnetic path and a hole portion 66*b* corresponding to an outer magnetic path are formed.

Figure 3G:
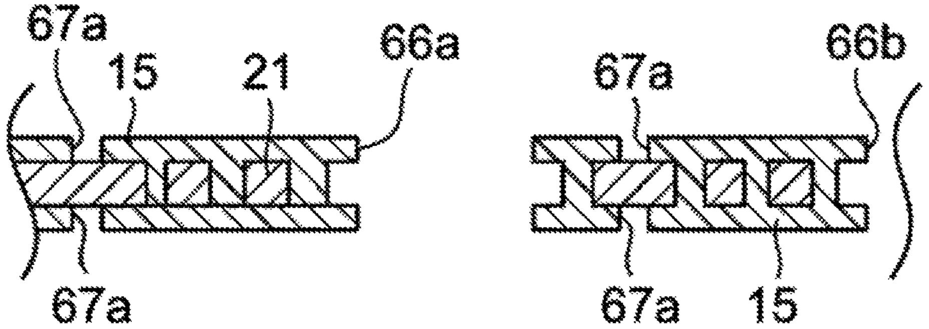
FIG. 3G is an explanatory diagram illustrating the method of manufacturing the inductor component according to the first embodiment.
Figure 3H:
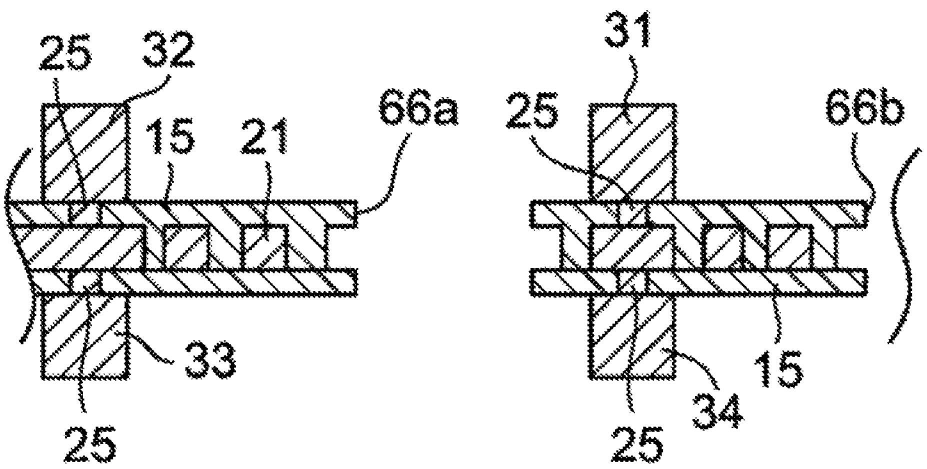
FIG. 3H is an explanatory diagram illustrating the method of manufacturing the inductor component according to the first embodiment.

Subsequently, as illustrated in FIG. 3G, an insulator cavity 67*a* is formed in the insulator 15 by laser processing or the like. Then, as illustrated in FIG. 3H, the insulator cavity 67*a* is filled with copper based on SAP to form the via wire 25, and the columnar wires 31 to 34 are formed on the insulator 15.

Figure 3I:
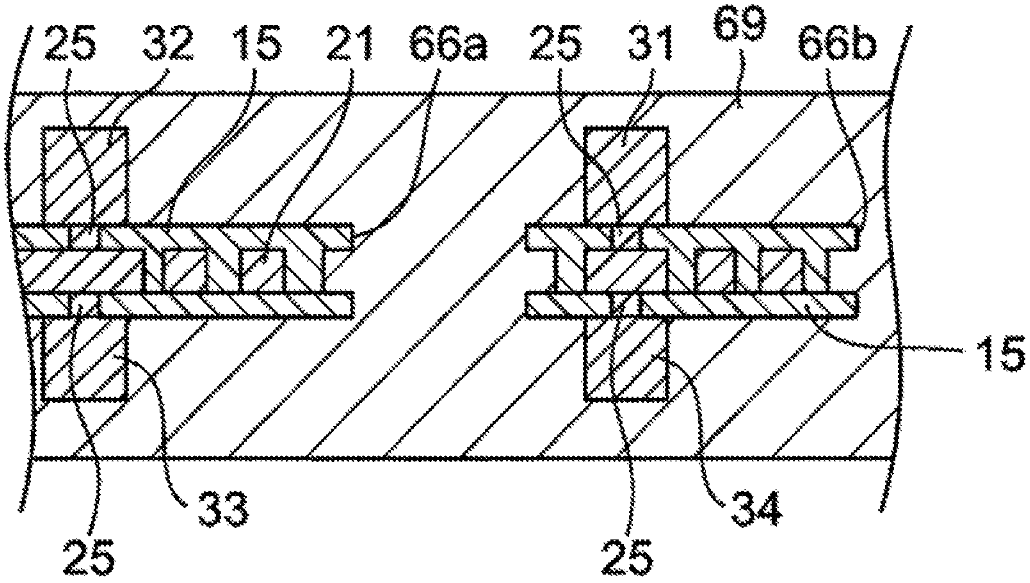
FIG. 3I is an explanatory diagram illustrating the method of manufacturing the inductor component according to the first embodiment.

Then, as illustrated in FIG. 3I, the spiral wire 21, the insulator 15, and the columnar wires 31 to 34 are covered with a magnetic material 69 (main body 11), and thus an inductor substrate is formed. Thermocompression bonding and thermosetting of the magnetic material 69 are performed using a vacuum laminator, a press machine, and the like. In this process, the holes 66*a* and 66*b* are also filled with the magnetic material 69.

Figure 3J:
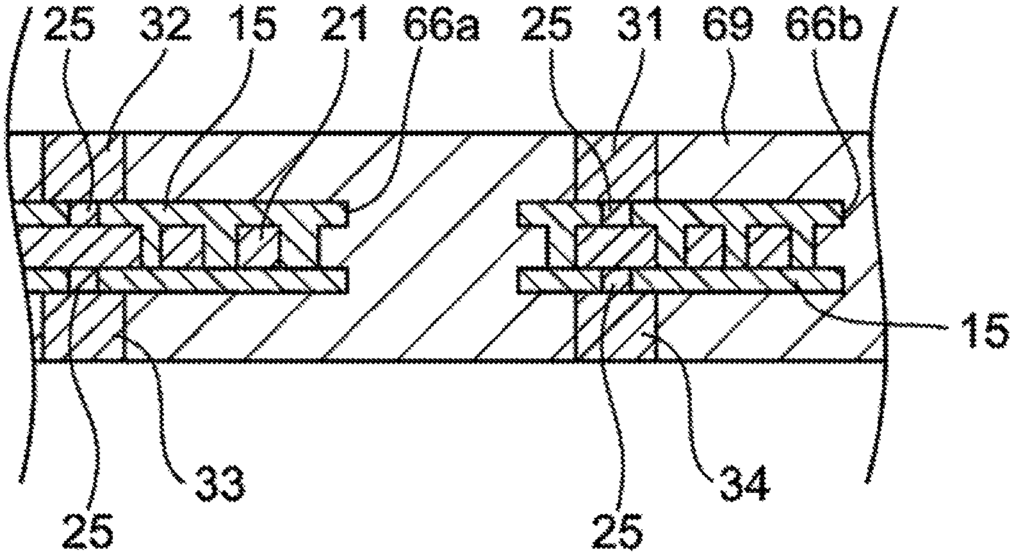
FIG. 3J is an explanatory diagram illustrating the method of manufacturing the inductor component according to the first embodiment.

Then, as illustrated in FIG. 3J, the magnetic material 69 above and below the inductor substrate is thinned by grinding. As a result, a part of the columnar wires 31 to 34 is exposed, whereby exposed portions of the columnar wires 31 to 34 are formed on the same plane of the magnetic material 69. In this process, the magnetic material 69 may be ground until the thickness sufficient for obtaining an inductance value is achieved, so that the inductor component 1 can have a small thickness.

This process is controlled so that unevenness is formed on the main surface 12 as illustrated in FIG. 1C, with the first arithmetic mean roughness $R_{a1}$ of the main surface 12 of the main body 11 satisfying Formula (1). For example, the unevenness can be formed by intentionally removing the magnetic powder 13 from the main surface 12 of the main body 11 by grinding the magnetic material 69 with relatively low bonding strength to the magnetic powder 13 and the resin piece 14 after the thermocompression bonding and before the thermosetting. With the thermosetting conducted after the grinding, the inductor component 1 can have higher strength.

Figure 3K:
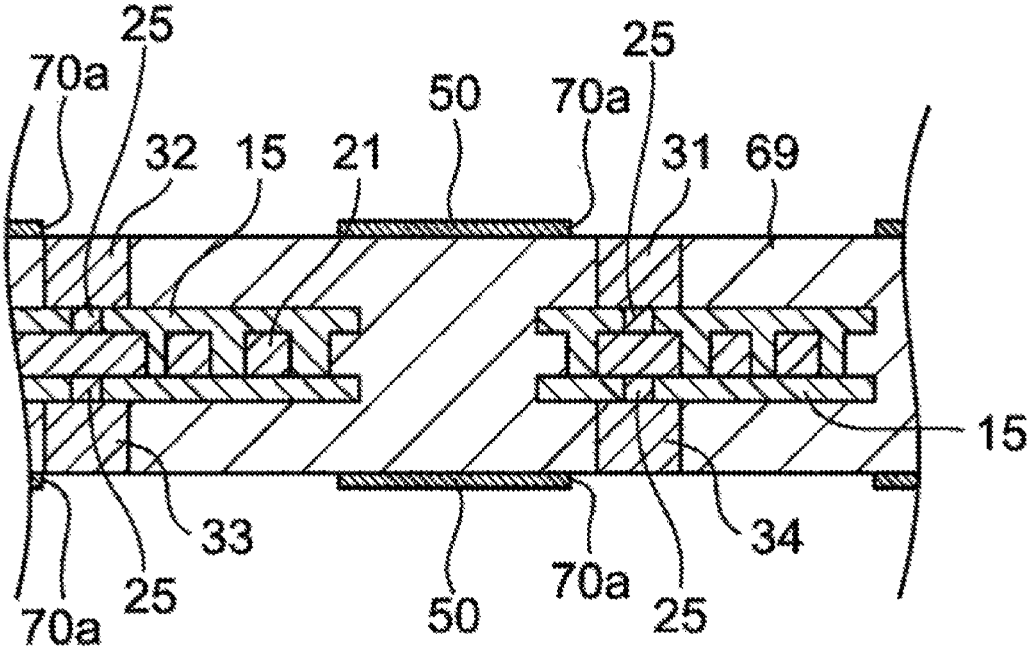
FIG. 3K is an explanatory diagram illustrating the method of manufacturing the inductor component according to the first embodiment.

Then, as illustrated in FIG. 3K, the coating layer 50 is formed on the main surface 12 of the main body 11 by printing. Cavities 70*a* in the coating layer 50 are portions where the external terminals 41 to 44 are formed. The cavities 70*a* are formed by printing in the present example, but may be formed by photolithography.

Figure 3L:
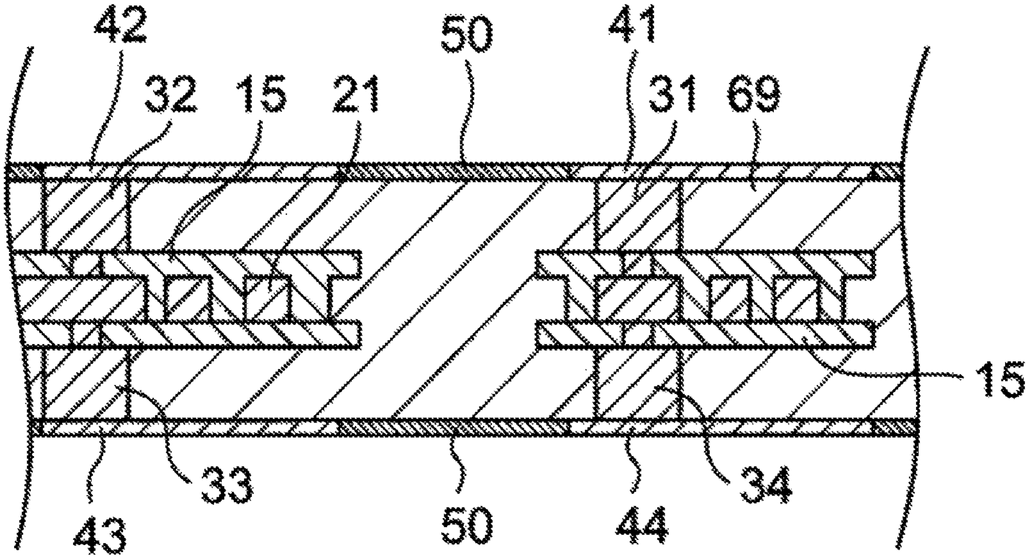
FIG. 3L is an explanatory diagram illustrating the method of manufacturing the inductor component according to the first embodiment.
Figure 3M:
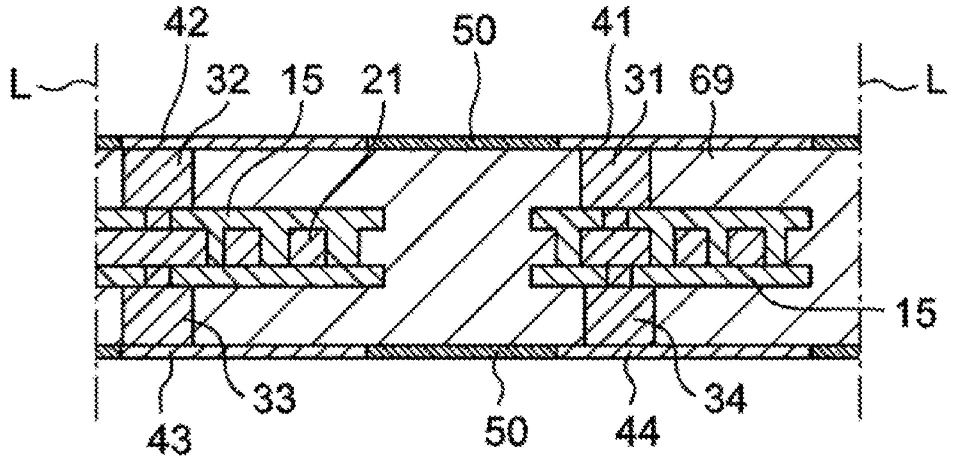
FIG. 3M is an explanatory diagram explaining the method of manufacturing the inductor component according to the first embodiment.

Next, as illustrated in FIG. 3L, electroless copper plating or plating of Ni, Au, or the like are applied to form the first to the fourth external terminals 41 to 44. Then, individual pieces are separated by cutting with a dicing machine along broken lines L as illustrated in FIG. 3M to obtain the inductor component 1 illustrated in FIGS. 1A and 1B. Although a description with reference to FIG. 3B onward is omitted, inductor substrates may be formed on both surfaces of the dummy core substrate 61. With this configuration, higher productivity can be obtained.

As illustrated in FIG. 2, the inductor component 1' in which only the bottom surface of the spiral wire 21 is covered by the insulator 15 can be manufactured by a method similar to that of the inductor component 1 illustrated in FIGS. 3A to 3M, except that the steps of FIG. 3D and FIG. 3E are omitted, and the step of forming the insulator cavity 67*a* on the upper surface side in FIG. 3G are also omitted.

Second Embodiment

[Configuration]

Figure 4:
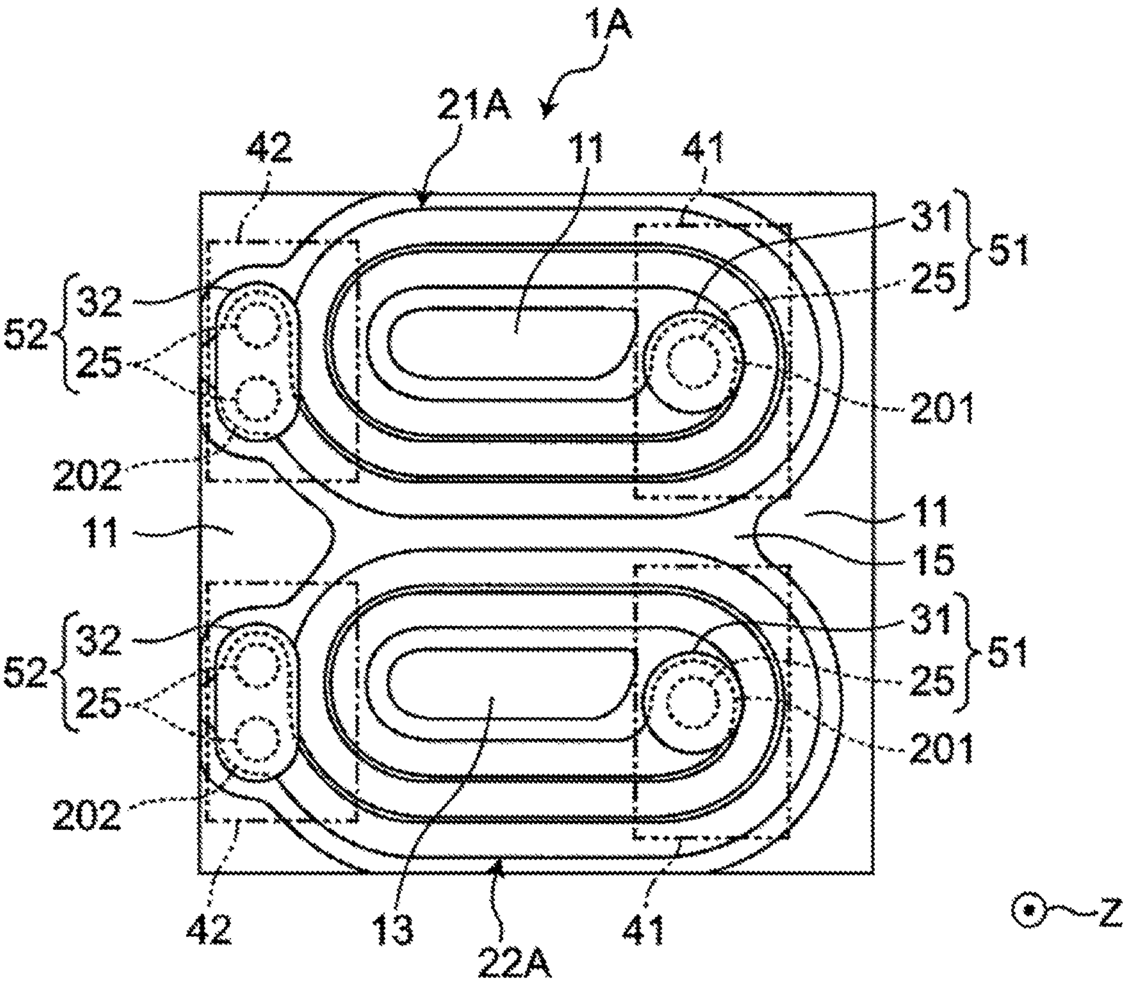
FIG. 4 is a perspective plan view illustrating an inductor component according to a second embodiment.

FIG. 4 is a perspective plan view illustrating an inductor component according to a second embodiment. The second embodiment differs from the first embodiment in the configuration of spiral wires (more specifically, the shape and the number of spiral wires). This difference in the configuration will be described below. In the second embodiment, the same reference numerals as those in the first embodiment have the same configurations as those in the first embodiment, and therefore their explanations are omitted.

In an inductor component 1A according to the second embodiment, as illustrated in FIG. 4, spiral wires 21A and 22A have a substantially track shape composed of a semi-circular portion and a straight line portion on the same plane. The spiral wires 21A and 22A are spirally wound clockwise from an inner circumference edge (first pad portion 201) toward an outer circumference edge (second pad portion 202) when viewed in the first direction Z.

Furthermore, in the inductor component 1A of the second embodiment, as illustrated in FIG. 4, the plurality of spiral wires 21A and 22A are arranged on the same plane, in contrast to the first embodiment. The inductor component 1A of the second embodiment can reduce the influence on the thickness T by adopting such an array structure. Furthermore, an inductor array can be formed by the plurality of spiral wires 21A and 22A arranged in the same plane.

The first and the second spiral wires 21A and 22A are close to each other. That is, the magnetic flux generated in the first spiral wire 21A wraps around the adjacent second spiral wire 22A, and the magnetic flux generated in the second spiral wire 22A wraps around the adjacent first spiral wire 21A. Therefore, the magnetic coupling between the first spiral wire 21A and the second spiral wire 22A is strong.

Note that when currents flow simultaneously from the inner circumference edge of one of the first and the second spiral wires 21A and 22A toward the outer circumference edge thereof, and from the outer circumference edge of the other spiral wire toward the inner circumference edge thereof, their magnetic fluxes strengthen each other. This means that, when the inner circumference edge of one of the first and the second spiral wires 21A and 22A serves as the input side of a pulse signal, the outer circumference edge thereof serves as the output side of the pulse signal, the outer circumference edge of the other spiral wire serves as the input side of the pulse signal, and the inner circumference edge thereof serves as the output side of the pulse signal, the first spiral wire 21A and the second spiral wire 22A are positively coupled with each other. By contrast, when currents flow simultaneously from the inner circumference edges of both the first and the second spiral wires 21A and 22A toward the outer circumference edges thereof, or from the outer circumference edges toward the inner circumference edges thereof, their magnetic fluxes cancel each other out. This means that, when the inner circumference edges of the first and the second spiral wires 21A and 22A serve as the input side of a pulse signal, the outer circumference edges thereof serve as the output side of the pulse signal, or the outer circumference edges serve as the input side of the pulse signal, and the inner circumference edges thereof serve as the output side of the pulse signal, the first spiral wire 21A and the second spiral wire 22A are negatively coupled with each other.

The first spiral wire 21A and the second spiral wire 22A are integrally covered with the insulator 15, and ensure the electrical insulation property of the first spiral wire 21A and the second spiral wire 22A.

In the inductor component 1A, the two spiral wires are arranged on the same plane, but three or more spiral wires may be arranged on the same plane.

Furthermore, in this embodiment, the straight line defining $R_{a1}$ is a straight line passing through the external terminals 41 and 42 of the spiral wires 21A and 22A. The straight line is, for example, a straight line connecting the center point of the first external terminal 41 and the center point of the second external terminal 42 in the spiral wire 21A, and a straight line connecting the center point of the first external terminal 41 and the center point of the second external terminal 42 in the spiral wire 22A. It suffices if Formula (1) holds for these two straight lines. However, the straight line may pass through any two of all the external terminals 41 and 42. When there are a plurality of straight lines on one main surface 12, Formula (1) may be satisfied for at least two straight lines among the plurality of straight lines.

Third Embodiment

[Configuration]

Figure 5:
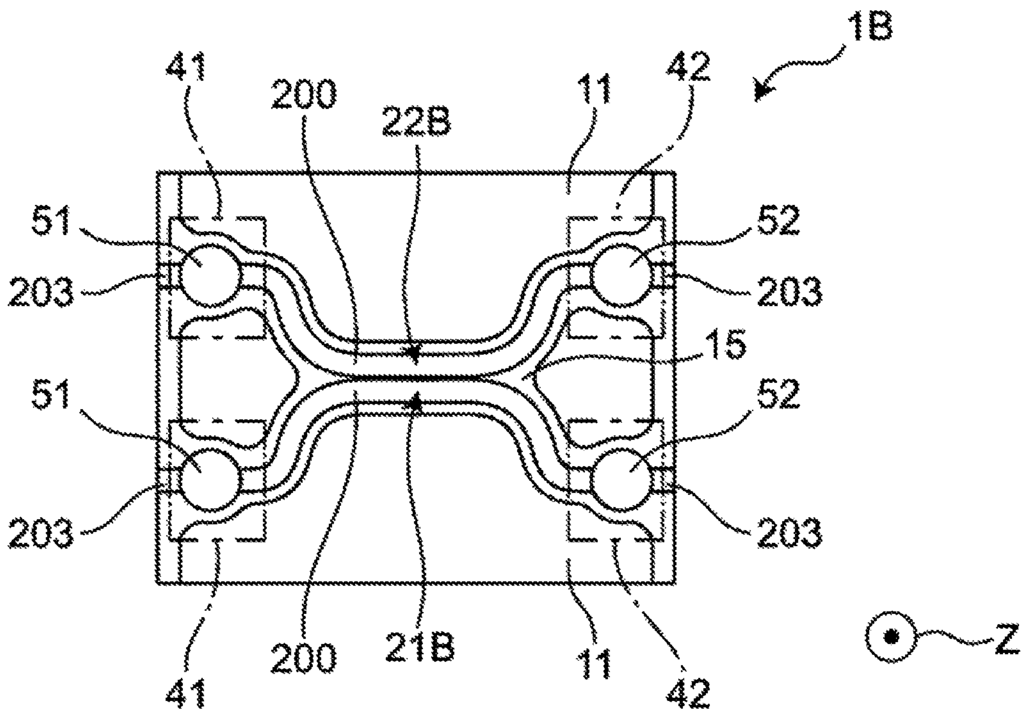
FIG. 5 is a perspective sectional view illustrating an inductor component according to a third embodiment.

FIG. 5 is a perspective plan view illustrating an inductor component according to a third embodiment. The third embodiment differs from the first embodiment in the configuration of spiral wires (more specifically, the shape and the number of spiral wires). This difference in the configuration will be described below. In the third embodiment, the same reference numerals as those in the first embodiment have the same configurations as those in the first embodiment, and therefore their explanations are omitted.

In an inductor component 1B according to the third embodiment, as illustrated in FIG. 5, spiral wires 21B and 22B have a substantially semi-elliptical arc shape on the same plane when viewed in the first direction Z. That is, the spiral wires 21B and 22B are curved wires that are wound by about half a circumference. Furthermore, the spiral wires 21B and 22B each include a straight line portion in the middle portion.

Both ends of the spiral wires 21B and 22B are electrically connected to the first vertical wire 51 and the second vertical wire 52 located outside, drawing an arc curve toward the center side of the inductor component 1B from the first vertical wire 51 and the second vertical wire 52.

Here, in each of the spiral wires 21B and 22B, a range surrounded by a curve drawn by the spiral wires 21B and 22B and a straight line connecting both ends of the spiral wires 21B and 22B is defined as an inner diameter portion. Here, when viewed from the first direction, the inner diameter portions of the spiral wires 21B and 22B do not overlap with each other.

Furthermore, in the inductor component 1B of the third embodiment, as illustrated in FIG. 5, the plurality of spiral wires 21B and 22B are arranged on the same plane, in contrast to the first embodiment. The inductor component 1B of the third embodiment can reduce the influence on the thickness T by adopting such an array structure. Furthermore, an inductor array can be formed by the plurality of spiral wires arranged in the same plane.

Meanwhile, the first and the second spiral wires 21B and 22B are close to each other. That is, as already described in the second embodiment, the magnetic coupling between the first spiral wire 21B and the second spiral wire 22B is strong.

In addition, in the first and the second spiral wires 21B and 22B, when currents simultaneously flow from one end on the same side to the other end on the opposite side, their mutual magnetic fluxes strengthen each other. This means that, when first edges of the first spiral wire 21B and the second spiral wire 22B on the same side serve as the input side of a pulse signal and their second ends on the opposite side serve as the output side of the pulse signal, the first spiral wire 21B and the second spiral wire 22B are positively coupled with each other. By contrast, for example, when one edge side of one of the first spiral wire 21B and the second spiral wire 22B serves as the input and its other edge side serves as an output, and one edge side of the other spiral wire serves as the output and its other edge side serves as the input, the first spiral wire 21B and the second spiral wire 22B can be in a state of being negatively coupled with each other.

The first vertical wire 51 connected to one edge side of the spiral wires 21B and 22B and the second vertical wire 52 connected to the other edge side of the spiral wires 21B and 22B each penetrate the inside of the main body 11 and are exposed on the upper surface. The first external terminal 41 is electrically connected to the first vertical wire 51, and the second external terminal 42 is electrically connected to the second vertical wire 52.

The first spiral wire 21B and the second spiral wire 22B are integrally covered with the insulator 15, and ensure the electrical insulation property of the first spiral wire 21B and the second spiral wire 22B.

The spiral wires 21B and 22B each include a spiral portion 200, pad portions (not illustrated), and a lead portion 203. The spiral portion 200 is electrically connected between the pad portions. The lead portion 203 is pulled out from each of the pad portions to the side surface of the main body 11 parallel to the first direction Z, and is exposed to the outside from the side surface of the main body 11.

In the first spiral wire 21B, each lead portion 203 extends at a position of 180° with respect to the spiral portion 200, and in the second spiral wire 22B, each lead portion 203 is extends at a position of 180° with respect to the spiral portion 200.

In this embodiment, the straight line defining $R_{a1}$ is a straight line passing through the external terminals 41 and 42 of the spiral wires 21A and 22A. The straight line is, for example, a straight line connecting the center point of the first external terminal 41 and the center point of the second external terminal 42 in the spiral wire 21B, and a straight line connecting the center point of the first external terminal 41 and the center point of the second external terminal 42 in the spiral wire 22B. It suffices if Formula (1) holds for these two straight lines. Note that the straight line may pass through any two of all the external terminals 41 and 42. When there are a plurality of straight lines on one main surface 12, Formula (1) may be satisfied for at least two straight lines among the plurality of straight lines.

Fourth Embodiment

[Configuration]

Figure 6A:
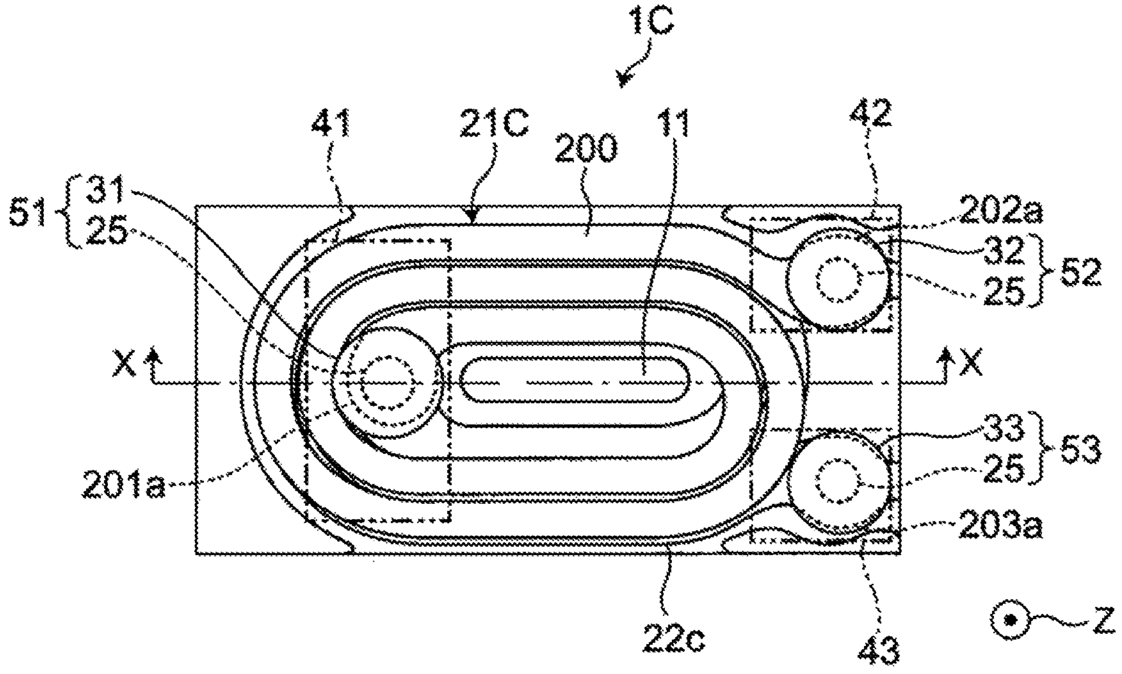
FIG. 6A is a perspective sectional view illustrating an inductor component according to a fourth embodiment.
Figure 6B:
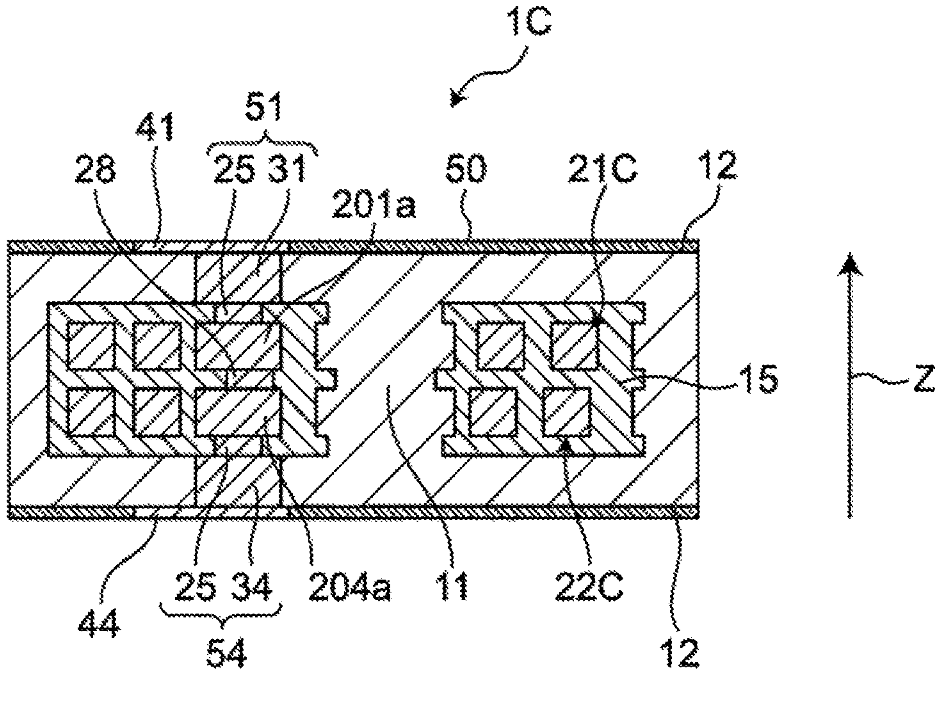
FIG. 6B is a sectional view illustrating the inductor component according to the fourth embodiment.

FIG. 6A is a perspective plan view illustrating an inductor component according to a fourth embodiment. FIG. 6B is a sectional view (sectional view taken along X-X in FIG. 6A) of the inductor component according to the fourth embodiment. The fourth embodiment differs from the first embodiment in the configuration of spiral wires (more specifically, the shape and the number of spiral wires) and a second via wire further provided that connects the first spiral wire and the second spiral wire in series. This difference in the configuration will be described below. In the fourth embodiment, the same reference numerals as those in the first embodiment have the same configurations as those in the first embodiment, and therefore their explanations are omitted.

In an inductor component 1C according to the fourth embodiment, as illustrated in FIGS. 6A and 6B, spiral wires 21C and 22C have a substantially track shape composed of a semicircular portion and a straight line portion on the same plane. Furthermore, the first spiral wire 21C is spirally wound counterclockwise from an outer circumference edge (second pad portion 202*a*) toward an inner circumference edge (first pad portion 201*a*) when viewed in the first direction Z. The second spiral wire 22C is spirally wound clockwise from an outer circumference edge (third pad portion 203*a*) toward an inner circumference edge (fourth pad portion 204*a*).

Furthermore, in the inductor component 1C of the fourth embodiment, as illustrated in FIGS. 6A and 6B, the plurality of spiral wires 21C and 22C are arranged in a direction orthogonal to the main surface 12 of the main body 11 (first direction Z), in contrast to the first embodiment. The inductor component 1C of the fourth embodiment can reduce the influence on the mounting area by stacking the plurality of spiral wires. As a result, the inductor component 1C can be further downsized. Furthermore, if the spiral wires stacked are connected in series, the inductance of the inductor component 1C can be enhanced.

The inner circumference edge (first pad portion 201*a*) of the first spiral wire 21C is electrically connected to the first external terminal 41 with the first vertical wire 51 (via wire 25 and first columnar wire 31) on the upper side of the inner circumference edge interposed therebetween. The outer circumference edge (second pad portion 202*a*) of the first spiral wire 21C is electrically connected to the second external terminal 42 with the second vertical wire 52 (via wire 25 and second columnar wire 32) on the upper side of the outer circumference edge interposed therebetween.

The second spiral wire 22C is arranged below the first spiral wire 21C. The inner circumference edge (fourth pad portion 204*a*) of the second spiral wire 22C is electrically connected to the fourth external terminal 44 with the fourth vertical wire 54 (via wire 25 and fourth columnar wire 34) on the lower side of the inner circumference edge interposed therebetween. The outer circumference edge (third pad portion 203*a*) of the second spiral wire 22C is electrically connected to the third external terminal 43 with the third vertical wire 53 (via wire 25 and third columnar wire 33) on the upper side of the outer circumference edge interposed therebetween.

The first spiral wire 21C and the second spiral wire 22C are connected in series with a second via wire 28 interposed therebetween. With this configuration, in the inductor component 1C, since the first spiral wire 21C and the second spiral wire 22C are connected in series by the second via wire 28, the inductance value can be increased by increasing the number of turns. Furthermore, since the first to the fourth vertical wires 51 to 54 can be extended from the outer circumferences of the first and the second spiral wires 21C and 22C, the inner diameters of the first and the second spiral wires 21C and 22C can be made large, and the inductance value can be improved.

In the inductor component 1C, the two spiral wires are arranged in the first direction Z, but three or more spiral wires may be arranged in the orthogonal direction.

Furthermore, in this embodiment, the straight line defining $R_{a1}$ may pass through any two of all the external terminals 41, 42, and 43. The straight line is, for example, a straight line connecting the center point of the second external terminal 42 and the center point of the third external terminal 43. When there are a plurality of straight lines on one main surface 12, Formula (1) may be satisfied for at least one straight line among the plurality of straight lines.

Examples

First Example

In a first example, the inductor component 1C included a flat plate-shaped main body 11 including magnetic powder 13 and a resin piece 14 containing the magnetic powder 13, spiral wires 21C and 22C arranged in the main body 11, and external terminals 41 to 44 electrically connected to the spiral wires 21C and 22C and exposed from a main surface 12 of the main body 11. The plurality of spiral wires 21C and 22C were arranged in a direction orthogonal to the main surface 12. In the inductor component 1 of the first example, the average particle size X ($D_{50}$) of the magnetic powder 13 was 2.5 μm, the first arithmetic mean roughness $R_{a1}$ was 0.27 μm, and the thickness T orthogonal to the main surface 12 of the main body 11 was 190 μm. The inductor component 1 of the first example thus satisfied Formula (1).

The dimensions of the inductor component 1 were 1.2 mm width×0.6 mm length. The coating layer 50 had a thickness of 10 μm. The external terminals 41 to 44 were multilayer metal films and were bottom electrodes exposed only from the main surfaces 12 of the main body 11. The multilayer metal films were metal films in which a Cu layer thickness of 5 μm), a Ni layer (a thickness of 5 μm), and an Au layer (a thickness of 0.1 μm) were stacked in this order from the end surfaces of the columnar wires 31 to 34. The content ratio of the magnetic powder 13 was 74 vol % with respect to the entire main body 11. The columnar wires 31 to 34 had a substantially columnar shape. The columnar wires 31 to 34 had a substantially circular shape when viewed from the Z direction and had a diameter of 60 μm. The measurement magnification was 50 times, and the measurement area was 100 μm×100 μm.

In addition, the inductor component 1 of the first example had an inductance value L of 5.0 nH, a DC electric resistance value Rdc of 17.5 Ω·cm, a bending strength exceeding 5 N, and a fixing strength of 9 N. That is, in the inductor component 1 of the first example, the degradation of the insulation property, the inductance acquisition efficiency, and mechanical strength was suppressed.

Second Example

The second example was substantially the same as the first example except that the following X and $R_{a1}$ were different. The average particle size X ($D_{50}$) of the magnetic powder 13 was 30 μm, the first arithmetic mean roughness $R_{a1}$ was 7.26 μm, and the thickness T orthogonal to the main surface 12 of the main body 11 was 190 μm. The inductor component 1 of the second example thus satisfied Formula (1).

Inductor Component Embedded Substrate

Fifth Embodiment

[Configuration]

Figure 7:
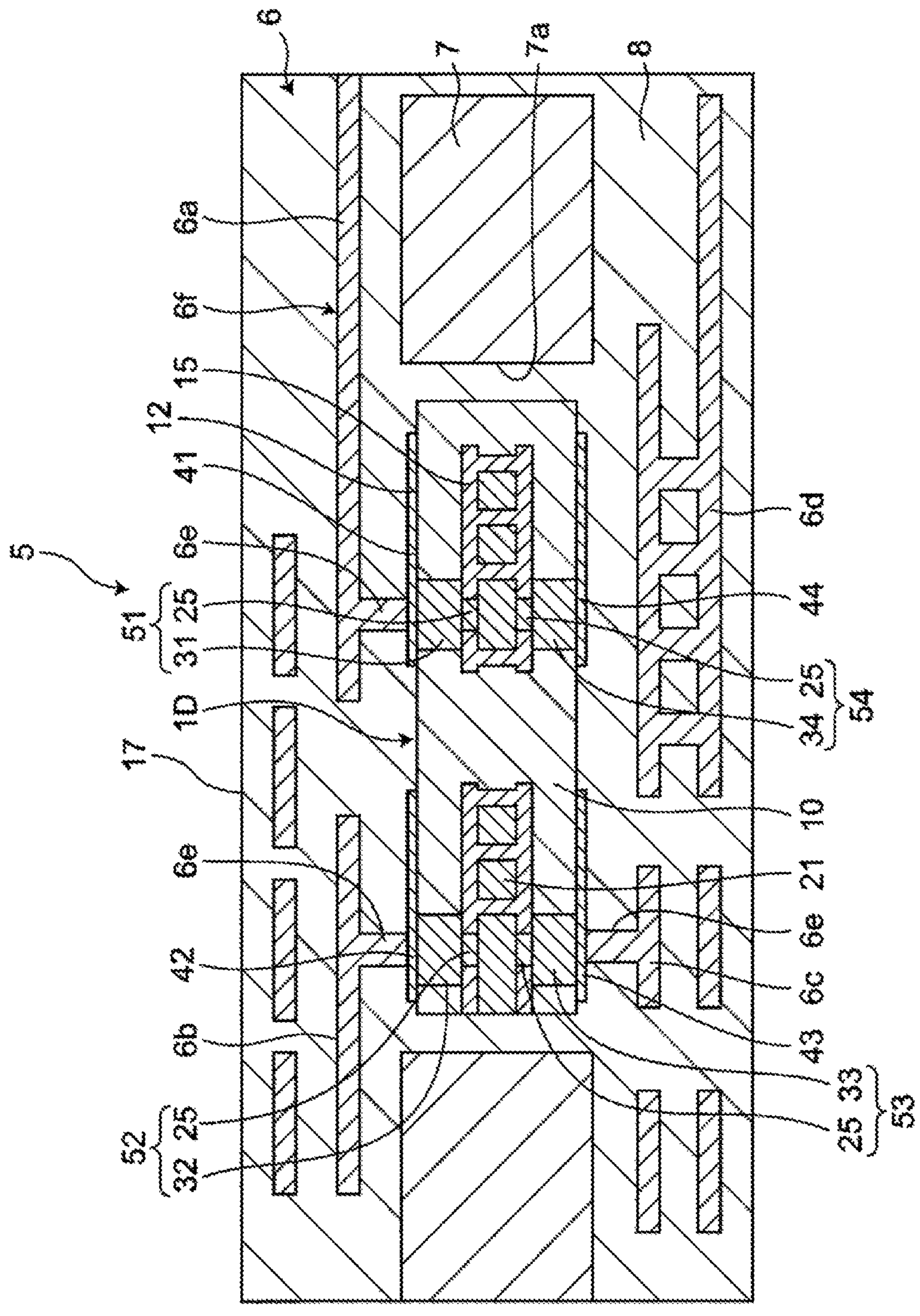
FIG. 7 is a sectional view of an inductor component embedded substrate according to a fifth embodiment.

FIG. 7 is a sectional view illustrating an inductor component embedded substrate according to a fifth embodiment. As illustrated in FIG. 7, the inductor component embedded substrate 5 of the fifth embodiment of the present disclosure is a substrate 6 in which an inductor component 1D is embedded. The substrate 6 has a substrate main surface 17, a substrate wiring **6*f* extending along the substrate main surface 17, and substrate via portions 6*e* extending orthogonal to the substrate main surface 17 and connected to the substrate wiring 6*f*. The external terminals 41 to 44 of the inductor component 1D are directly connected to the substrate via portions 6*e***.

The inductor component 1D differs from the inductor component 1 according to the first embodiment in that it does not include the coating layer 50. Note that in the fifth embodiment, the same reference numerals as those in the first embodiment have the same configurations as those in the first embodiment, and therefore their explanations are omitted.

The substrate 6 further includes a core material 7, an insulating layer 8, and pattern portions **6*a* to 6*d* extending in the direction along the substrate main surface 17. The inductor component 1D is arranged in a through hole 7*a* of the core material 7, and is covered with the insulating layer 8 together with the core material 7. Since the insulating layer 8 covers the main surface 12 having unevenness, the bonding between the main surface 12 and the insulating layer 8** is improved by an anchor effect.

The main surface 12 of the main body 11 of the inductor component 1D and the substrate main surface 17 are preferably parallel to each other. When the main surface 12 of the inductor component 1D and the substrate main surface 17 are parallel to each other, the inductor component embedded substrate can be made thinner. Furthermore, the inductor component 1D may be embedded in the substrate 6 in a state where the substrate main surface 17 and the main surface 12 of the main body 11 and the plane around which the spiral wire 21 is wound are substantially parallel to each other. In such a case, the first direction Z in the inductor component 1D (the normal direction to the plane around which the spiral wire 21 is wound) substantially coincides with the thickness direction of the substrate 6 and is substantially orthogonal to the substrate main surface 17.

The external terminals 41 to 43 of the inductor component 1D are directly connected to the substrate via portions **6*e*. That is, the substrate wiring 6*f* is connected to the external terminals of the inductor component 1D at the substrate via portions 6*e*. The substrate via portions 6*e* includes a first via portion connected to the inductor component 1D from the upper side in the first direction Z, and a second via portion connected to the inductor component 1D from the lower side in the first direction Z. Specifically, the first external terminal 41 is connected to a first pattern portion 6*a* with the substrate via portion 6*e* (first via portion) on the upper side of the first external terminal 41 interposed therebetween. The second external terminal 42 is connected to a second pattern portion 6***b* with the substrate via portion 6*e* (first via portion) on the upper side of the second external terminal 42 interposed therebetween. The third external terminal 43 is connected to a third pattern portion 6*c* with the substrate via portion 6*e* (second via portion) below the third external terminal 43 interposed therebetween. The inductor component embedded substrate 5 of the present disclosure has such a configuration, and thus includes an inductor component in which the degradation of the insulation property, the inductance acquisition efficiency, and mechanical strength is suppressed.

Therefore, in the inductor component embedded substrate 5, the spiral wire 21 of the inductor component 1D and the substrate wiring 6*f* are connected by the vertical wires 51 to 53 and the substrate via portion 6*e* extending in the first direction Z. This means that the spiral wire 21 and the substrate wiring 6*f* are connected without requiring extra wire routing. The inductor component embedded substrate 5 can effectively utilize the vacant space by omitting such extra wire routing, and thus the degree of freedom in circuit design can be improved as compared with conventional inductor components and inductor component embedded substrates.

Furthermore, the inductor component embedded substrate 5 requires no extra wire routing, so that the wiring resistance can be reduced. Furthermore, in the inductor component embedded substrate 5, by embedding a relatively large inductor component 1D in the substrate 6, the entire circuit can be made smaller and thinner.

The substrate wiring 6*f* is electrically connected from both sides (upper and lower sides) of the inductor component 1D in the first direction Z (not illustrated). In this case, compared with conventional inductor component embedded substrates in which substrate wirings are connected only from one side of the inductor component 1D, the number of layout options for the pattern portions 6*a* to 6*d* are increased, and the degree of freedom in circuit design is improved.

The inductor component embedded substrate 5 of the fifth embodiment may further include a dummy terminal. For example, in FIG. 7, when the fourth external terminal 44 is electrically connected to the pattern portion 6*d* of the substrate wiring 6*f* with the substrate via portion 6*e* interposed therebetween, without the fourth vertical wire 54, the fourth external terminal 44 can function as a dummy terminal. In such a case, the inductor component 1D can serve as a heat radiation path, ensuring the fourth external terminal 44 and the substrate wiring 6*f*. In particular, since the substrate wiring 6*f* is made of copper and has very high thermal conductivity, the heat generated from the inductor component 1D is efficiently radiated from the fourth external terminal 44 serving as a dummy terminal via the substrate wiring 6*f*, whereby the heat dissipation can be improved. When the pattern portion 6*d* of the substrate wiring 6*f* is a ground line, the fourth external terminal can function as an electrostatic shield.

Furthermore, as described in the first embodiment, in the inductor component 1D, the area of the external terminals is larger than the area of the columnar wires 31 to 34 when viewed in the first direction Z, so that the area of the external terminals can be increased. Therefore, in embedding the inductor component 1D in the substrate 6, when providing the substrate via portion 6*e* to be connected to the external terminals of the inductor component 1D in the substrate 6, it is possible to make a large margin for the formation position of the substrate via portion 6*e* with respect to the external terminals, whereby the yield at the time of embedding can be improved.

In FIG. 7, only the inductor component 1D and the substrate wiring 6*f* are illustrated in the inductor component embedded substrate 5, but other electronic components such as a semiconductor component, a capacitor component, or a resistor component may be embedded in the inductor component embedded substrate 5. Furthermore, another electronic component may be surface-mounted on the substrate main surface 17, or a semiconductor chip may be joined thereto.

The present disclosure is not limited to the above-described embodiments, and can be carried out in various aspects as long as they do not change the gist of the present disclosure. Furthermore, the configurations illustrated in the above-described embodiments are an example and are not particularly limited, and various modifications can be made without substantially departing from the effects of the present disclosure. For example, when only one external terminal is provided on the main surface, a straight line defining $R_{a1}$ is a straight line passing through one external terminal. Here, by satisfying Formula (1), it is possible to suppress the occurrence of electrical short circuiting from the external terminals to another wire or the like.

Furthermore, in the above-described embodiments, the inductor wires are spiral wires, but the inductor wires are not limited to the above-described embodiments, and various known structures and shapes such as a straight shape, a meander shape, and a helical shape can be used.

What is claimed is:

1. An inductor component comprising:

a flat plate-shaped main body containing magnetic powder and a resin piece containing the magnetic powder;

an inductor wire arranged in the main body; and an external terminal electrically connected to the inductor wire and exposed from a main surface of the main body, an average particle size X of the magnetic powder, a thickness T orthogonal to the main surface of the main body, and a first arithmetic mean roughness $R_{a1}$ of a part of a straight line on the main surface passing through the external terminal and excluding a part of the straight line overlapping with the external terminal satisfying Formula (1):

$$X/10 \leq R_{a1} \leq T/10 \qquad \text{Formula (1)},$$

wherein the main surface of the main body of the inductor component includes unevenness formed from removal of the magnetic powder from the main surface resulting in recesses formed in the resin piece, and wherein the part of the straight line on the main surface passing through the external terminal and excluding the part of the straight line overlapping with the external terminal, when viewed in sectional view, includes unevenness formed from removal of the magnetic powder from the main surface resulting in recesses formed in the resin piece.

2. The inductor component according to claim 1, wherein the thickness T is 300 μm or less.

3. The inductor component according to claim 2, wherein a second arithmetic mean roughness $R_{a2}$ of an entire straight line including a part of the straight line on the main surface passing through the external terminal and including a part of the straight line overlapping with the external terminal satisfies Formula (2):

$$R_{a2} < T/10 \qquad (2).$$

4. The inductor component according to claim 2, further comprising:

a coating layer including a non-magnetic material that covers the main surface.

5. The inductor component according to claim 1, wherein the thickness of the external terminal orthogonal to the main surface is smaller than T/10.

6. The inductor component according to claim 1, wherein a second arithmetic mean roughness $R_{a2}$ of an entire straight line including a part of the straight line on the main surface passing through the external terminal and including a part of the straight line overlapping with the external terminal satisfies Formula (2):

$$R_{a2}<T/10 \quad (2).$$

7. The inductor component according to claim 1, further comprising:

a coating layer including a non-magnetic material that covers the main surface, wherein the coating layer fills the recesses in the resin piece.

8. The inductor component according to claim 1, further comprising:

an insulator including a non-magnetic material with which the inductor wire is in contact.

9. The inductor component according to claim 8, wherein the insulator includes any of an epoxy resin, a phenol resin, a polyimide resin, an acrylic resin, a vinyl ether resin, and a mixture thereof.

10. The inductor component according to claim 1 wherein the inductor wire extends parallel to the main surface.

11. The inductor component according to claim 10, further comprising:

a vertical wire which extends orthogonal to the main surface, is connected to the inductor wire and the external terminal, and penetrates the main body.

12. The inductor component according to claim 10, wherein a plurality of the inductor wires are arranged in a direction orthogonal to the main surface.

13. The inductor component according to claim 10, wherein a plurality of the inductor wires are arranged in a same plane.

14. The inductor component according to claim 1, wherein the magnetic powder includes Fe-based magnetic powder.

15. The inductor component according to claim 1, wherein the magnetic powder includes ferrite powder.

16. The inductor component according to claim 1, wherein the main body further contains non-magnetic powder including an insulator.

17. The inductor component according to claim 1, wherein the resin piece containing the magnetic powder includes an epoxy resin or an acrylic resin.

18. An inductor component embedded substrate that is a substrate in which the inductor component according to claim 1 is embedded, the substrate comprising a substrate main surface;

a substrate wiring extending along the substrate main surface; and a substrate via portion extending orthogonal to the substrate main surface and connected to the substrate wiring, the external terminal of the inductor component being directly connected to the substrate via portion.

19. The inductor component embedded substrate according to claim 18, wherein the main surface of the main body of the inductor component and the substrate main surface are parallel to each other.

20. The inductor component according to claim 1, wherein the external terminal is directly on the main surface of the main body.

21. An inductor component comprising:

a flat plate-shaped main body containing magnetic powder and a resin piece containing the magnetic powder;

first and second inductor wires arranged in the main body; and first and second external terminals electrically connected to the first and second inductor wires, respectively, and exposed from a main surface of the main body, an average particle size X of the magnetic powder, a thickness T orthogonal to the main surface of the main body, and a first arithmetic mean roughness $R_{a1}$ of a first part of a straight line on the main surface passing through the first and second external terminals and excluding second parts of the straight line overlapping with the first and second external terminals satisfying Formula (1):

$$X/10 \leq R_{a1} \leq T/10 \quad \text{Formula (1)},$$

wherein the first part of the straight line on the main surface passing through the first and second external terminals and excluding the second parts of the straight line overlapping with the first and second external terminals, when viewed in sectional view, includes unevenness formed from removal of the magnetic powder from the main surface resulting in recesses formed in the resin piece.

22. The inductor component according to claim 21, wherein the first and second external terminals are directly on the main surface of the main body.

* * * * *